US007726020B2

(12) United States Patent
Ebara et al.

(10) Patent No.: US 7,726,020 B2
(45) Date of Patent: Jun. 1, 2010

(54) METHOD OF MANUFACTURING A COMPRESSOR

(75) Inventors: Toshiyuki Ebara, Gunma-ken (JP); Hiroyuki Matsumori, Gunma-ken (JP); Takashi Sato, Saitama-ken (JP); Dai Matsuura, Gunma-ken (JP); Takayasu Saito, Saitama-ken (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 446 days.

(21) Appl. No.: 11/808,966

(22) Filed: Jun. 14, 2007

(65) Prior Publication Data

US 2008/0010826 A1 Jan. 17, 2008

Related U.S. Application Data

(62) Division of application No. 10/949,233, filed on Sep. 27, 2004, now abandoned.

(30) Foreign Application Priority Data

| | | |
|---|---|---|
| Oct. 3, 2003 | (JP) | ............................ 2003-346133 |
| Oct. 6, 2003 | (JP) | ............................ 2003-347011 |
| Oct. 10, 2003 | (JP) | ............................ 2003-352569 |

(51) Int. Cl.
*B23P 15/00* (2006.01)

(52) U.S. Cl. ............................ 29/888.022; 29/888.02; 29/888.021; 417/902; 417/220; 417/415; 417/416

(58) Field of Classification Search ............. 29/888.02, 29/888.021, 888.022, 888.023, 888.024, 29/888.025; 417/902, 220, 415, 416; 285/136.1
See application file for complete search history.

(56) References Cited

U.S. PATENT DOCUMENTS

| | | | | |
|---|---|---|---|---|
| 4,806,735 | A * | 2/1989 | Ditschun et al. | ......... 219/130.5 |
| 6,274,845 | B1 * | 8/2001 | Stava et al. | ............ 219/125.12 |
| 7,179,061 | B2 * | 2/2007 | Horton et al. | ............... 417/220 |

FOREIGN PATENT DOCUMENTS

| | | |
|---|---|---|
| EP | 0 581 685 A1 | 2/1994 |
| EP | 0 958 952 A1 | 11/1999 |
| EP | 1 251 020 A1 | 10/2002 |
| JP | 2003-120561 | 4/2003 |

OTHER PUBLICATIONS

European Search Report dated Jun. 6, 2005 issued in corresponding European Application No. 04021472.8.

* cited by examiner

*Primary Examiner*—Rick K Chang
(74) *Attorney, Agent, or Firm*—Westerman, Hattori, Daniels & Adrian, LLP

(57) ABSTRACT

A compressor capable of surely preventing leakage of a refrigerant gas from a connection portion between an airtight container and a pipe to the outside at low cost is provided. The compressor comprises an airtight container to which a refrigerant introduction pipe is connected, and a compression element received in the airtight container to discharge the refrigerant into the same. The refrigerant introduction pipe has a cylindrical pipe main body, and a jaw-like flange portion formed in a tip of the pipe main body. A cylindrical connection sleeve is disposed between the refrigerant introduction pipe and the airtight container. A first bolt is disposed to connect the connection sleeve to the airtight container, and a second bolt is disposed to connect the connection sleeve to the flange portion of the refrigerant introduction pipe. The flange portion of the refrigerant introduction pipe hides the first bolt.

2 Claims, 11 Drawing Sheets

METHOD OF MANUFACTURING A COMPRESSOR

This application is a divisional of application Ser. No. 10/949,233, filed Sep. 27, 2004.

BACKGROUND OF THE INVENTION

The present invention relates to a compressor used for, e.g., an on-vehicle air conditioner or a water heater.

The on-vehicle air conditioner or the water heater has conventionally comprised a refrigerant circuit constituted of a heat exchanger and a compressor. For example, the compressor comprises an electric element, and first and second compression elements connected to the electric element, and an airtight container which receives the electric element and the compression elements. The compressor drives the compression elements by the electric element, thereby compressing an introduced low-pressure refrigerant at the first compression element and feeing the refrigerant into the airtight container by intermediate pressure. Further, the compressor compresses the refrigerant of the intermediate pressure in the airtight container at the second compression element, and discharges the refrigerant by high pressure. A plurality of pipes are connected to the airtight container. That is, the refrigerant is introduced through the pipe to the first compression element, and discharged through the pipe (e.g., see Japanese Patent Application Laid-Open No. 2003-120561). Each of the pipes comprises, e.g., a cylindrical pipe main body, and a jaw-like flange portion formed in a tip of the pipe main body. The pipe is mounted to the airtight container by fixing the flange portion of the pipe to a surface of the airtight container through a bolt. As described above, however, the airtight container is filled with the refrigerant of the intermediate pressure. Consequently, when a tip of the bolt which connects the pipe to the airtight container projects therein, i.e., when the bolt penetrates the airtight container, there occurs a problem of leakage of the refrigerant of the intermediate pressure from an engaging portion of the bolt with the airtight container to the outside.

To solve the problem, the projection of the bolt in the airtight container is prevented by forming a portion of the airtight container connected to the pipe (referred to as pipe connection portion, hereinafter) thicker than other portions by cutting or welding.

However, even when the pipe connection portion is formed by cutting, a shape of the airtight container becomes complex, and manufacturing costs of the compressor increase. Furthermore, even when the pipe connection portion is formed by welding another member to the airtight container, welding heat causes a drop in strength of the airtight container.

SUMMARY OF THE INVENTION

The present invention provides a compressor designed to surely prevent leakage of a refrigerant gas from a connection portion between an airtight container and a pipe to the outside at low costs.

A first aspect of the present invention is directed to a compressor comprising an airtight container to which a pipe of a refrigerant is connected, and a compression element received in the airtight container to discharge the refrigerant into the same, wherein the pipe has a cylindrical pipe main body, and a jaw-like flange portion formed in a tip of the pipe main body, a connection sleeve is disposed between the pipe and the airtight container, a first connection tool is disposed to connect the connection sleeve to the airtight container, and a second connection tool is disposed to connect the connection sleeve to the flange portion of the pipe, and the flange portion of the pipe hides the first connection tool.

According to the invention, the airtight container and the connection sleeve are connected to each other by the first connection tool, and then the connection sleeve and the flange portion of the pipe are connected to each other by the second connection tool. At this time, even when a tip of the first connection tool projects in the airtight container, and a refrigerant passed through an aperture between the first connection tool and the airtight container and discharged into the airtight container leaks to the first connection tool side, since the flange portion of the pipe hides the first connection tool, it is possible to surely prevent leakage of the refrigerant from the first connection tool to the outside. Since no thick portion is necessary for the airtight container itself, a shape thereof can be simplified to reduce manufacturing costs. Additionally, since no unnecessary welding heat is applied to the airtight container, it is possible to prevent a drop in strength thereof.

A second aspect of the present invention is directed to the above compressor, wherein a gasket is disposed at least between the airtight container and the connection sleeve or between the connection sleeve and the pipe.

According to the invention, by disposing the gasket between the airtight container and the connection sleeve, it is possible to prevent leakage of the refrigerant of the airtight container through the aperture between the connection sleeve and the airtight container to the outside. Additionally, by disposing the gasket between the connection sleeve and the pipe, it is possible to prevent leakage of the refrigerant between the connection sleeve and the pipe to the outside even when the refrigerant of the airtight container leaks to the first connection tool side.

A third aspect of the present invention is directed to the above compressor, wherein the airtight container and the connection sleeve are made of aluminum.

According to the invention, since the airtight container and the connection sleeve are made of aluminum, by pressing the connection sleeve to the airtight container to crush a part thereof, and bonding the connection sleeve to the airtight container, it is possible to prevent leakage of the refrigerant discharged into the airtight container through the aperture between the connection sleeve and the airtight container to the outside. Additionally, by pressing the pipe to the connection sleeve to crush a part of the latter, and by bonding the connection sleeve to the pipe, it is possible to prevent leakage of the refrigerant between the connection sleeve and the pipe to the outside even when the refrigerant of the airtight container leaks to the first connection tool side.

According to the compressor of the invention, the following effects can be provided. The airtight container and the connection sleeve are connected to each other by the first connection tool, and then the connection sleeve and the flange portion of the pipe are connected to each other by the second connection tool. At this time, even when the tip of the first connection tool projects in the airtight container, and the refrigerant passed through the aperture between the first connection tool and the airtight container and discharged into the airtight container leaks to the first connection tool side, since the flange portion of the pipe hides the first connection tool, it is possible to surely prevent leakage of the refrigerant from the first connection tool to the outside. Since no thick portion is necessary for the airtight container itself, a shape thereof can be simplified to reduce manufacturing costs. Additionally, since no unnecessary welding heat is applied to the airtight container, it is possible to prevent a drop in strength thereof.

Another object of the present invention is to provide a method of manufacturing a compressor which can surely fix a compression element to an airtight container even when the compression element and the airtight container are made of low-melting point metals.

A fourth aspect of the present invention is directed to a method of manufacturing a compressor which comprises an electric element, a compression element connected to the electric element, and an airtight container to receive the electric element and the compression element therein, and which drives the compression element by the electric element to compress and discharge an introduced refrigerant, the method comprising bringing the compression element into contact with the inside of the airtight container; forming a through-hole which penetrates the airtight container and reaches a predetermined depth of the compression element from the outside of the airtight container; and dropping droplets into the through-hole from a wire of a welder to weld the airtight container and the compression element together.

According to the invention, first, the compression element is brought into contact with the inside of the airtight container by, e.g., shrinkage-fitting. Next, the through-hole which penetrates the airtight container and reaches the predetermined depth of the compression element is formed from the outside of the airtight container by, e.g., drilling. Subsequently, an arc is generated between the wire of the welder and the through-hole in an atmosphere of an inactive gas such as an argon gas, droplets are dropped into the through-hole from the wire of the welder to fill the hole, and the airtight container and the compression element are welded together. Thus, since the hole of a predetermined depth is formed beforehand in the compression element, it is not necessary to sufficiently melt the compression element by the droplets. Accordingly, it is possible to surly fix the compression element to the airtight container even when the compression element or the airtight container is made of a low-melting point metal.

A fifth aspect of the present invention is directed to the above method, wherein the airtight container and at least a portion of the compression element brought into contact with the airtight container are made of aluminum.

According to the invention, since the airtight container and at least the portion of the compression element brought into contact with the airtight container are made of aluminum, it is possible to reduce weight while securing the strength and rigidity of the compressor.

An outer size of the wire may be set to 1 mm or higher to 2.5 mm or lower, and a diameter of the through-hole may be set larger by twice or four times than the outer size of the wire. Accordingly, the compression element can be welded to the airtight container more surely by surely filling the through-hole with the droplets from the wire. If the diameter of the through-hole is less than twice the outer size of the wire, there is a fear that the droplets from the wire will not reach the hole formed in the compression element. On the other hand, if the diameter of the through-hole exceeds a size which is larger by four times than the outer size of the wire, there is a fear that the through-hole will not be completely filled with the droplets from the wire.

Additionally, a depth of the through-hole formed in the compression element may be 10% or more of a plate thickness of the airtight container. Accordingly, the droplets that enter the compression element can be sufficiently secured. Thus, it is possible to weld the compression element to the airtight container more surely. If the depth of the compression element is less than 10% of the plate thickness of the airtight container, there is a fear that sure welding will not be executed because of a small amount of droplets that fill the hole formed in the compression element.

The through-holes may be formed at predetermined intervals along the contact surface between the airtight container and the compression element. Accordingly, it is possible to fix the compression element along the contact surface with the airtight container by a uniform force.

That is, according to the compressor manufacturing method of the present invention, the following effects can be provided. Regarding the compressor which comprises the electric element, the compression element connected to the electric element, and the airtight container to receive the electric element and the compression element, and which compresses and discharges the introduced refrigerant by driving the compression element by the electric element, the following manufacturing process is employed. The compression element is brought into contact with the inside of the airtight container, the through-hole which penetrates the airtight container and reaches the predetermined depth of the compression element is formed from the outside of the airtight container, and the droplets are dropped into the through-hole from the wire of the welder to weld together the airtight container and the compression element. Specifically, the compression element is brought into contact with the inside of the airtight container by, e.g., shrinkage-fitting. Next, the through-hole which penetrates the airtight container and reaches the predetermined depth of the compression element is formed from the outside of the airtight container by, e.g., drilling. Subsequently, the droplets are dropped into the through-hole from the wire of the welder to fill the hole, and the airtight container and the compression element are welded together. Thus, since the hole of a predetermined depth is formed beforehand in the compression element, it is not necessary to sufficiently melt the compression element by the droplets. Accordingly, it is possible to surly fix the compression element to the airtight container even when the compression element or the airtight container is made of a low-melting point metal.

Another object of the present invention is to prevent deterioration of sealing between the airtight container and a sleeve when the sleeve is fixed to the airtight container by a screw. The object of preventing the deterioration of sealing between the airtight container and the sleeve is realized by a simple structure in which a gasket only is disposed between the airtight container and the sleeve.

A sixth aspect of the present invention is directed to a compressor which comprises a driving element and a compression element to be driven by the driving element in an airtight container, a refrigerant sucked through a refrigerant pipe of a refrigerant introduction side being compressed by the compression element and discharged through a refrigerant pipe of a refrigerant discharge side, wherein a sleeve is disposed which is mounted corresponding to a hole formed in a curved surface of the airtight container and to which the refrigerant pipes are connected, a flat surface is formed in an outer surface of the airtight container around the hole, and the sleeve is fixed through a gasket to the flat surface of the airtight container by a screw, and a collar communicated with the compression element is brought into contact with the inside of the sleeve by a sealing material.

A seventh aspect of the present invention is directed to the above compressor, wherein the airtight container is made of aluminum.

According to the present invention, there is provided a sealed type compressor which comprises a driving element and a compression element driven by the driving element in an airtight container, and compresses a refrigerant sucked from a refrigerant pipe of a refrigerant introduction side by the compression element and discharges the refrigerant from a refrigerant pipe of a refrigerant discharge side. A sleeve is disposed which is mounted corresponding to a hole formed in a curved surface of the airtight container, and to which the refrigerant pipes are connected, a flat surface is formed in an outer surface of the airtight container around the hole, and the sleeve is fixed through a gasket to the flat surface of the airtight container by a screw, and a collar communicated with the compression element is brought into contact with the inside of the sleeve by a sealing material. Thus, for example, as specified in claim 2, it is possible to easily fix the sleeve to the airtight container while securing sealing even when the airtight container is made of an aluminum material.

Especially, since the sleeve is fixed through the gasket to the flat surface around the hole formed in the outer surface of the airtight container by the screw, for example, the gasket portion can play a role of a relief valve. Accordingly, for example, it is possible to release high pressure from the gasket portion when the pressure of the refrigerant gas compressed by the compression element of the sealed type compressor excessively increases to set abnormally high pressure in the airtight container. Therefore, since it is possible to prevent the danger of destruction of the airtight container caused by the abnormally high pressure therein, durability of the compressor can be greatly improved, and reliability can be secured.

DETAILED DESCRIPTION OF THE PREFERRED EMBODIMENTS

Figure 1:
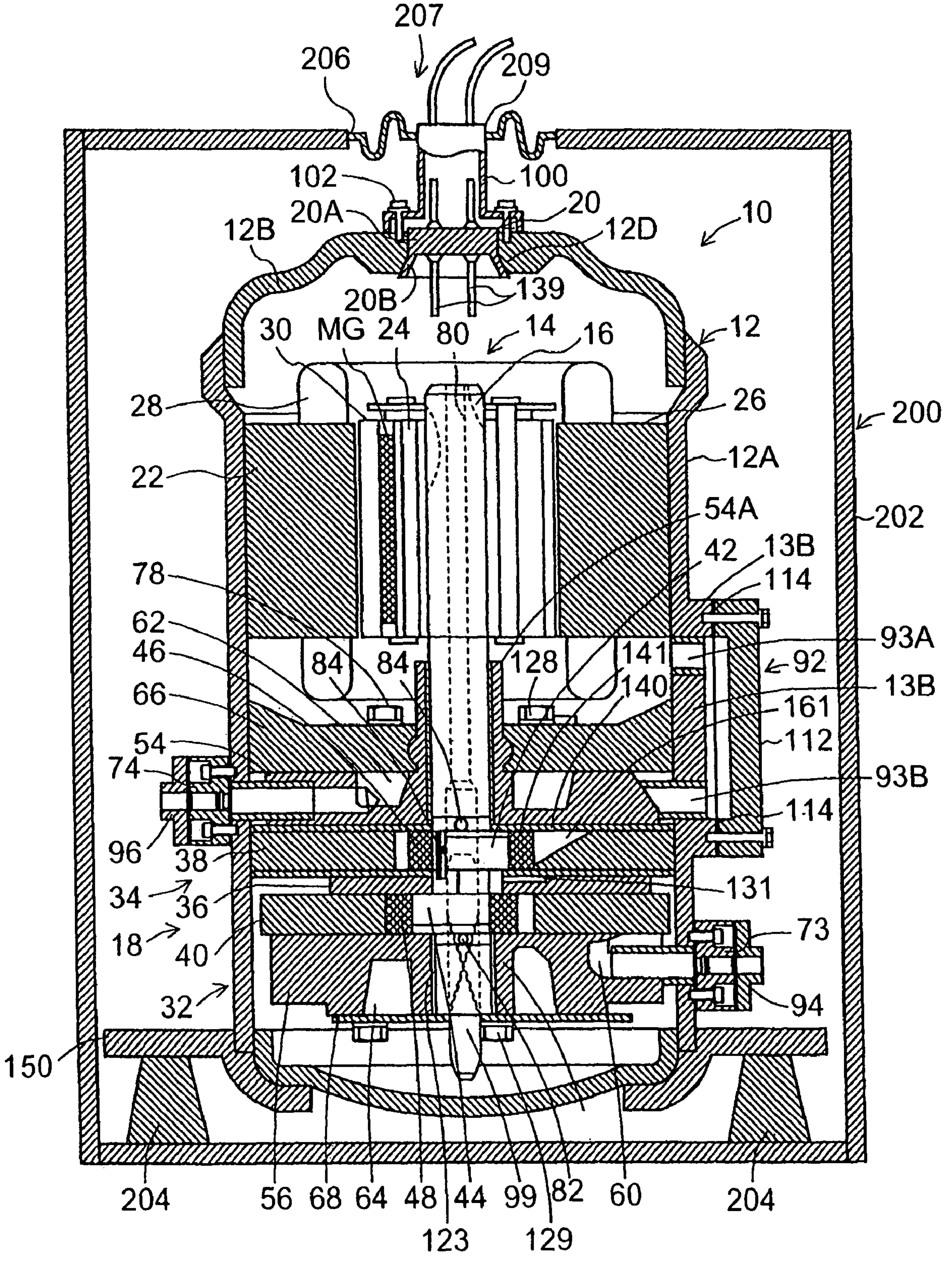
FIG. 1 is a vertical sectional view showing a compressor according to a first embodiment of the present invention.

Next, the preferred embodiments of the present invention will be described with reference to the accompanying drawings. In the embodiments below, similar components are denoted by similar reference numerals, and description thereof will be omitted or simplified.

First Embodiment

FIG. 1 is a vertical sectional view showing a rotary compressor 10 as a compressor of an internal intermediate pressure type multistage (2 stage) compression system which comprises first and second rotary compression elements 32, 34 according to an embodiment.

The rotary compressor 10 is a rotary compressor of an internal intermediate pressure type multistage compression system which is mounted in an engine room of a vehicle such as an electric car (HEV or PEV), and uses carbon dioxide ($CO_2$) for a refrigerant. This rotary compressor 10 comprises a cylindrical airtight container 12 made of aluminum, an electric element 14 received in an upper side of an internal space of the airtight container 12, and a rotary compression mechanism section 18 as a compression element received in a lower side of the internal space of the airtight container 12.

The electric element 14 comprises a stator 22 annularly formed along an inner peripheral surface of an upper space of the airtight container 12, and a rotor 24 rotatably disposed through a slight aperture inside the stator 22. The rotor 24 has a rotary shaft 16 extended through its rotational center in an axial direction.

The stator 22 has a laminated member 26 in which doughnut-shaped electromagnetic steel plates are stacked, and a stator coil 28 wound on a tooth portion of the laminated member 26 by series winding (concentrated winding). The rotor 24 comprises a laminated member 30 in which electromagnetic steel plates are stacked as in the case of the stator 22, and a permanent magnet MG arranged in the laminated member 30.

On the other hand, the rotary compression mechanism section 18 comprises first and second rotary compression elements 32 (1st stage) and 34 (2nd stage) as first and second compression elements driven by the electric element 14, an upper support member 54 and an upper cover 66 arranged on an upper side of the second rotary compression element 34, a intermediate partition plate 36 arranged between the first and second rotary compression elements 32, 34, and a lower support member 56 and a lower cover 68 arranged on a lower side of the first rotary compression element 32 to serve also as bearings of the rotary shaft 16. A displacement volume of the second rotary compression element 34 is smaller than that of the first rotary compression element 32.

Figure 2:
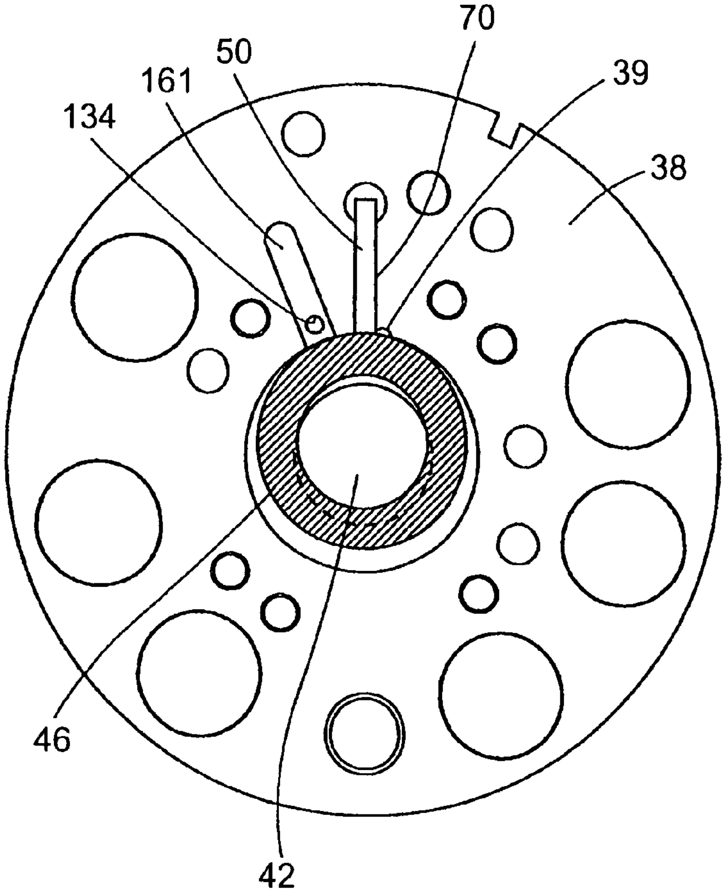
FIG. 2 is a cross sectional view showing a second compression element of the embodiment.

As shown in FIG. 2, the second rotary compression element 34 comprises an upper cylinder 38, an upper eccentric portion 42 arranged in the upper cylinder 38 and fixed to the rotary shaft 16, an upper roller 46 fitted around the upper eccentric portion 42, and an upper vane 50 (described later) brought into contact with the upper roller 46 to divide the inside of the upper cylinder 38 into low-pressure and high-pressure chamber sides. In the upper cylinder 38, a suction port 161 is formed to communicate a suction passage (described later) of the upper support member 54 with the low-pressure chamber side. Heat insulating plates 140, 141 are disposed between the upper cylinder 38 and the upper support member 54 and between the upper cylinder 38 and the intermediate partition plate 36.

According to the second rotary compression element 34, a refrigerant gas is sucked from the low-pressure side of the upper cylinder 38 into the cylinder. In this state, the rotary shaft 16 is rotated to cause eccentric rotation of the upper eccentric portion 42 and the upper roller 46, whereby a space in the cylinder which has sucked the refrigerant gas is reduced. As a result, the refrigerant gas is compressed to become a high pressure, and discharged from the high-pressure side of the upper cylinder 38.

The upper support member 54 comprises the suction passage connected to the suction port 161 of the upper cylinder 38, and a discharge muffling chamber 62 formed to be recessed on the upper side and connected through a discharge port 39 (see FIG. 2) to the high-pressure chamber side of the upper cylinder 38. Incidentally, in the upper support member 54, a discharge valve is disposed to open/close the discharge port 39.

The upper cover 66 closes the discharge muffling chamber 62 of the upper support member 54. Accordingly, the discharge muffling chamber 62 is separated from the electric element 14 side in the airtight container 12. This upper cover 66 is made of a roughly doughnut-shaped circular steel plate having a hole formed through which a bearing 54A of the upper support member 54 is put. The upper cover 66 is brought into contact with the inner peripheral surface of the airtight container 12, and fixed thereto by welding.

The first rotary compression element 32 comprises a lower cylinder 40, a lower eccentric portion 44 fixed to the rotary shaft 16 by a phase difference of 180° from the upper eccentric portion 42 in the lower cylinder 40, a lower roller 48 fitted around the lower eccentric portion 44, and a lower vane brought into contact with the lower roller 48 to divide the inside of the lower cylinder 40 into low-pressure and high-pressure chamber sides. In the lower cylinder 40, a suction port is formed to communicate a suction passage 60 (described later) of the lower support member 56 with the low-pressure chamber side.

According to the first rotary compression element 32, a refrigerant gas is sucked from the low-pressure side of the lower cylinder 40 into the cylinder. In this state, the rotary shaft 16 is rotated to cause eccentric rotation of the lower eccentric portion 44 and the lower roller 48, whereby a space in the cylinder which has sucked the refrigerant gas is reduced. As a result, the refrigerant gas is compressed to become a high pressure, and discharged from the high-pressure side of the lower cylinder 40.

The lower support member 56 comprises the suction passage 60 connected to the suction port of the lower cylinder 40, and a discharge muffling chamber 64 formed to be recessed on the lower side and connected through a discharge port to the high-pressure chamber side of the lower cylinder 40. Incidentally, in the lower support member 56, a discharge valve is disposed to open/close the discharge port.

The lower cover 68 closes the discharge muffling chamber 64 of the lower support member 56. The lower cover 68 is made of a doughnut-shaped circular steel plate, and fixed to the lower support member 56. An inner peripheral edge of the lower cover 68 projects inward from an inner surface of a bearing 56A of the lower support member 56. Accordingly, a lower end surface of a bush 123 is held by the lower cover 68 to be prevented from falling off.

The upper and lower cylinders 38, 40, the intermediate partition plate 36, the upper and lower support members 54, 56, and the upper and lower covers 66, 68 are fastened from the upper and lower sides by four main bolts 128 , , , and 129 , , , . That is, the main bolt 128 is inserted from the upper cover 66 side, and its tip is engaged with the lower support member 56. The main bolt 129 is inserted from the lower cover 68 side, and its tip is engaged with the upper support member 54.

In the upper and lower cylinders 38, 40 and the intermediate partition plate 36, a communication path is formed to communicate the discharge muffling chamber 64 of the lower support member 56 with the upper side of the upper cover 66 in the airtight container 12. An intermediate discharge pipe is erected in an upper end of the communication path. This intermediate discharge pipe is extended toward an aperture between the adjacent stator coils 28 wound on the stator 22 of the electric element 14. Thus, it is possible to suppress an increase in temperature of the electric element 14 by actively supplying a refrigerant gas of a relatively low temperature thereto.

In the rotary shaft 16, an oil hole 80 is formed to be extended in the axial direction, and oil supply holes 82, 84 are formed to be extended from the oil hole 80 in an axial intersection direction. The oil supply holes 82, 84 are extended to outer peripheral surfaces of the upper and lower eccentric portions 42, 44 of the rotary compression elements 32, 34. An inner peripheral surface side of the intermediate partition plate 36 is communicated with the outer peripheral surfaces of the upper and lower eccentric portions 42, 44. In the intermediate partition plate 36, a through-hole 131 is bored to communicate the outer peripheral surface with the inner peripheral surface, and a sealing material is pressed into the outer peripheral surface side of the through-hole 131 to seal the same. Additionally, a communication hole is bored to be extended upward in the midway of the through-hole 131. On the other hand, in the suction port 161 of the upper cylinder 38, a communication hole is bored to be connected to the communication hole of the intermediate partition plate 36.

As described later, since intermediate pressure is set in the airtight container 12, and pressure therein becomes higher than that in the upper cylinder 38, supplying of oil into the upper cylinder 38 becomes difficult. However, according to the aforementioned oil supply mechanism, the oil is drawn up from an oil reservoir of the bottom in the airtight container 12 by an oil pump 99 to rise through the oil hole 80, and supplied through the oil supply holes 82, 84, the through-hole 131 of the intermediate partition plate 36, and the communication hole to the suction port 161 of the upper cylinder 38.

As the refrigerant, the carbon dioxide ($CO_2$) which is a natural refrigerant friendly to the global environment is used in consideration of combustibility, toxicity and the like. As the oil (lubricant oil), existing oil such as mineral oil, alkylbenzene oil, ether oil, or ester oil is used.

The airtight container 12 of the aforementioned rotary compressor 10 is made of aluminum, and comprises a cylindrical container main body 12A which receives the electric element 14 and the rotary compression mechanism section 18, a bottom portion which becomes an oil reservoir to close a bottom opening of the container main body 12A, and a roughly bowl-shaped end cap (cap member) 12B which closes an upper opening of the container main body 12A.

The end cap 12B comprises an annular step portion formed by buckling extrusion molding and having a predetermined curvature, and a circular mounting hole 12D formed in the center. A terminal (wiring is omitted) 20 is mounted to the mounting hole 12D to supply power to the electric element 14. This terminal 20 comprises a circular glass portion 20A through which an electric terminal 139 is fixed, and a metal mounting portion 20B formed around the glass portion 20A and bulged in a jaw shape obliquely outward and downward.

A refrigerant introduction pipe 94 and a refrigerant discharge pipe 96 as pipes are connected to the outer surface of the container main body 12A of the airtight container 12. The refrigerant introduction pipe 94 is connected through a connection sleeve 73 to the container main body 12A, and communicated with the suction passage 60 of the lower support member 56. The refrigerant discharge pipe 96 is connected through a connection sleeve 74 to the container main body 12A, and communicated with the discharge muffling chamber 62 of the upper support member 54. The connection sleeve 73 is roughly positioned on a diagonal line of the connection sleeve 74.

Additionally, a refrigerant instruction portion 92 is disposed in the container main body 12A of the airtight container 12. This refrigerant introduction portion 92 is extended up and down, and positioned above the connection sleeve 73. The refrigerant introduction portion 92 communicates the suction passage of the upper support member 54 with the electric element 14 side in the airtight container 12.

The refrigerant introduction portion 92 has a thick portion 13B integrally formed in the container main body 12A of the airtight container 12, and a cap member 112 mounted to the outside of the thick portion 13B. The thick portion 13B has a communication pipe 93A which communicates the electric element 14 side in the airtight container 12 with the outside, a communication pipe 93B which communicates the suction passage of the upper support member 54 with the outside, and a groove semi-arc in section which is formed between the communication pipes 93A, 93B. On the other hand, the cap member 112 has a groove semi-arc in section which is formed on a section opposed to the groove of the thick portion 13B. The thick portion 13B and the cap member 112 are joined together through a gasket 114 to form the refrigerant introduction portion 92.

Figure 3:
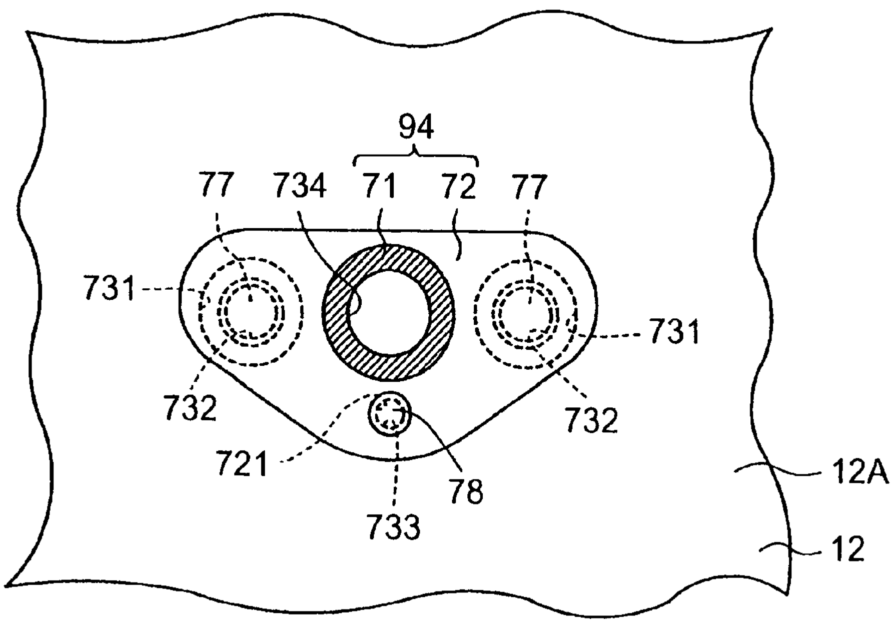
FIG. 3 is an enlarged front view of a connection portion between an airtight container and a pipe of the embodiment.
Figure 4:
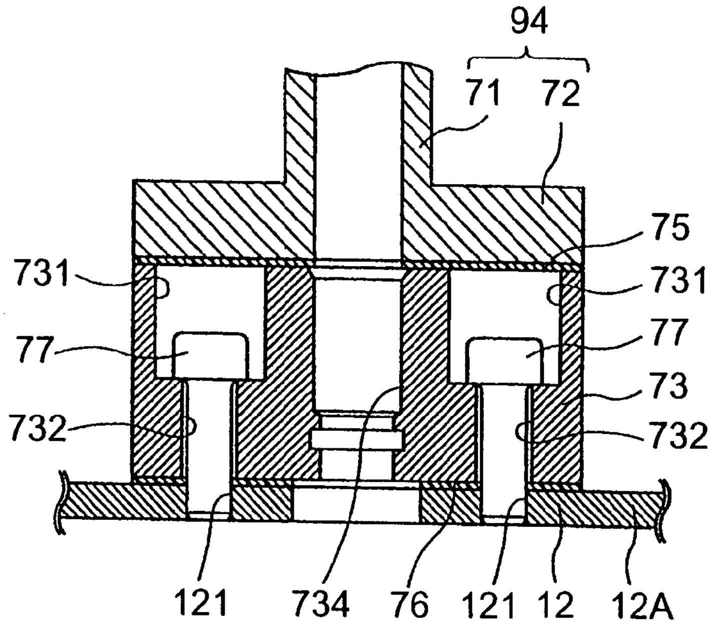
FIG. 4 is an enlarged sectional view of the connection portion between the airtight container and the pipe of the embodiment.

Now, a connection structure of the refrigerant introduction pipe 94, the connection sleeve 7, and the container main body 12A will be described with reference to FIGS. 3 and 4. A connection structure of the refrigerant discharge pipe 96, the connection sleeve 74, and the container main body 12A is similar to the above. The airtight container 12 and the connection sleeve 73 are connected to each other by two first bolts 77 as first connection tools, and the connection sleeve 73 and the refrigerant introduction pipe 94 are connected to each other by one second bolt 78 as a second connection tool.

Specifically, in the container main body 12A of the airtight container 12, two container female screw portions 121 in which female screws are formed to be engaged with the first bolts 77 are formed. The refrigerant introduction pipe 94 has a cylindrical pipe main body 71, and a roughly triangular flange portion 72 formed in a tip of the pipe main body 71. In the flange portion 72, a flange insertion portion 721 is formed to penetrate the front surface and the backside.

The connection sleeve 73 is roughly triangular in section as in the case of the flange portion 72 of the refrigerant introduction, and disposed between the flange portion 72 of the refrigerant introduction pipe 94 and the container main body 12A of the airtight container 12. An inner surface of the connection sleeve 73 is a through-hole 734 through which the refrigerant supplied from the pipe of the refrigerant introduction pipe 94 passes. The connection sleeve 73 has two sleeve hole portions 731 formed in an end surface of the refrigerant introduction pipe 94 side, and a sleeve insertion portion 732 which penetrates a bottom surface of the sleeve hole portion 731 and the end surface of the airtight container 12 side. Additionally, the connection sleeve 73 has a sleeve female screw portion 733 formed in a position different from that of the sleeve hole portion 731 of the end surface of the refrigerant introduction pipe 94 side and engaged with the second bolt 78.

The two sleeve hole portions 731 are arranged on opposing sides sandwiching the through-hole 734, and the sleeve female screw portion 733 is arranged to form a roughly triangular shape with the two sleeve hole portions 731.

Gaskets 75, 76 are disposed between the container main body 12A of the airtight container 12 and the connection sleeve 73 and between the connection sleeve 73 and the flange portion 72 of the refrigerant introduction pipe 94. The gasket 75 is in a roughly triangular shape corresponding to the sectional shape of the connection sleeve 73, and openings are formed in positions corresponding to the through-hole 734 and the sleeve insertion portion 732. The gasket 76 is in a roughly triangular shape corresponding to the sectional shape of the connection sleeve 73, and an opening is formed in a position corresponding to the through-hole 734.

The refrigerant introduction pipe 94, the connection sleeve 73, and the container main body 12A are connected by the following process. In a state in which the connection sleeve 73 is in contact with the airtight container 12, the first bolt 77 is inserted into the sleeve hole portion 731, and inserted through the sleeve insertion portion 732 to be engaged with the container female screw portion 121. Accordingly, the airtight container 12 and the connection sleeve 73 are connected to each other by the first bolt 77.

Next, the flange portion 72 of the refrigerant introduction pipe 94 is brought into contact with the connection sleeve 73 to cover the sleeve hole portion 731 thereof, thereby hiding the first bolt 77. In this state, the second bolt 78 is inserted into the flange insertion portion 721 from the flange portion 72 side of the refrigerant introduction pipe 94, and engaged with the sleeve female insertion portion 73 to connect the connection sleeve 73 to the flange portion 72 of the refrigerant introduction pipe 94.

Thus, even when the tip of the first bolt 77 projects in the container main body 12A of the airtight container 12, and the refrigerant of intermediate pressure leaks through an aperture between the first bolt 77 and the container main body 12A to the sleeve hole portion 731, it is possible to surely prevent leakage of the refrigerant from the sleeve hole portion 731 to the outside because the flange portion 72 of the refrigerant introduction pipe 94 hides the first bolt 77. Besides, since it is only necessary to cover the sleeve hole portion 731 with the flange portion 72 of the refrigerant introduction pipe 94, the rotary compressor 10 can be structured more simply.

Since no thick portion is portion is necessary for the container main body 12A, a shape thereof can be simplified to reduce manufacturing costs. Since no unnecessary welding heat is applied to the container main body 12A, it is possible to prevent a drop in strength of the container main body 12A.

Furthermore, by disposing the gasket 76 between the container main body 12A and the connection sleeve 73, it is possible to prevent leakage of the refrigerant of intermediate pressure through an aperture between the connection sleeve 73 and the container main body 12A to the outside. By disposing the gasket 75 between the connection sleeve 73 and the refrigerant introduction pipe 94, it is possible to prevent leakage of the refrigerant of intermediate pressure through the aperture between the connection sleeve 73 and the refrigerant introduction pipe 94 to the outside even when the refrigerant leaks to the sleeve hole portion 731.

The rotary compressor 10 is housed in a support device 200 which has a roughly cylindrical soundproof wall 202. This support device 200 is fixed in the engine room of the vehicle. Leakage of noise which accompanies running of the electric element 14 to the outside is prevented by covering the airtight container 12 of the rotary compressor 10 at a predetermined interval.

A roughly circular hole 206 is formed in an upper end of the soundproof wall 202. Inside the hole 206, a terminal cover 100 that covers the terminal 20 of the airtight container 12, and an annular upper elastic support member 207 that closes an aperture between the terminal cover 100 and the hole 206 are disposed.

The terminal cover 100 is fixed to the end cap 12B of the airtight container 12 by a bolt 102. The upper elastic support member 207 is made of an elastic material such as hard rubber, and curved to be wavy on the entire periphery. The upper elastic support member 207 is mounted to the terminal cover 100 in the inside, and mounted to the inside of the hole 206 of the soundproof wall 202 in the outside. Accordingly, the upper elastic support member 207 absorbs vibration transmitted from the terminal cover 100 by the curved portion to prevent transmission of the vibration from the rotary compressor 10 to the soundproof wall 202.

In a bottom surface of the soundproof wall 202, a support leg 150 mounted to the lower surface of the airtight container 12 of the rotary compressor 10, and an elastic mounting 204 that supports the support leg 150 are disposed. The elastic mounting 204 is made of an elastic material such as hard rubber, and a lower surface thereof is fixed to the soundproof wall 202. The support leg 150 is made of a thick aluminum plate, formed into a shape spread outward from the lower surface of the container main body 12A, and fixed to the elastic mounting 204 by a bolt (not shown).

Next, an operation of the rotary compressor 10 will be described. First, when power is supplied to the stator coil 28 of the electric element 14 through the terminal 20 and the wiring (not shown), the electric element 14 is started to rotate the rotor 24. Accordingly, the upper and lower rollers 46, 48 of the rotary compression elements 32, 34 are eccentrically rotated in the upper and lower cylinders 38, 40 by the rotary shaft 16 and the upper and lower eccentric portions 42, 44.

Then, the low-pressure (1st stage suction pressure LP: 4 MPaG) refrigerant gas in the refrigerant introduction pipe 94 is sucked into the rotary compressor 10. Specifically, the refrigerant gas is passed through the suction passage 60 of the lower support member 56 and sucked from the suction port into the low-pressure chamber side of the lower cylinder 40. The sucked low-pressure refrigerant gas is compressed by the operations of the lower roller 48 and the vane of the first rotary compression element 32 to become a refrigerant gas of intermediate pressure (1st stage discharge pressure MP1:8 MPaG). The refrigerant gas of intermediate pressure is passed from the high-pressure chamber side of the lower cylinder 40 through the discharge port, the discharge muffling chamber 64 of the lower support member 56, the communication path, and the intermediate discharge pipe, and discharged into the airtight container 12.

The refrigerant gas of intermediate pressure in the airtight container 12 is passed through the refrigerant introduction portion 92, the suction passage of the upper support member 54, and the suction port 161, and sucked into the low-pressure chamber side of the upper cylinder 38 (2nd stage suction pressure MP2:8 MPaG). The sucked refrigerant gas of intermediate pressure is further compressed by the operations of the upper roller 46 and the upper vane 50 of the second rotary compression element 34 to become a refrigerant gas of a high temperature and high pressure (2nd stage discharge pressure HP: 12 MPaG). The refrigerant gas of high pressure is passed from the high-pressure chamber side of the upper cylinder 38 through the discharge port 39, and the discharge muffling chamber 62 of the upper support member 54, and discharged into the refrigerant discharge pipe 96.

Second Embodiment

Figure 5:
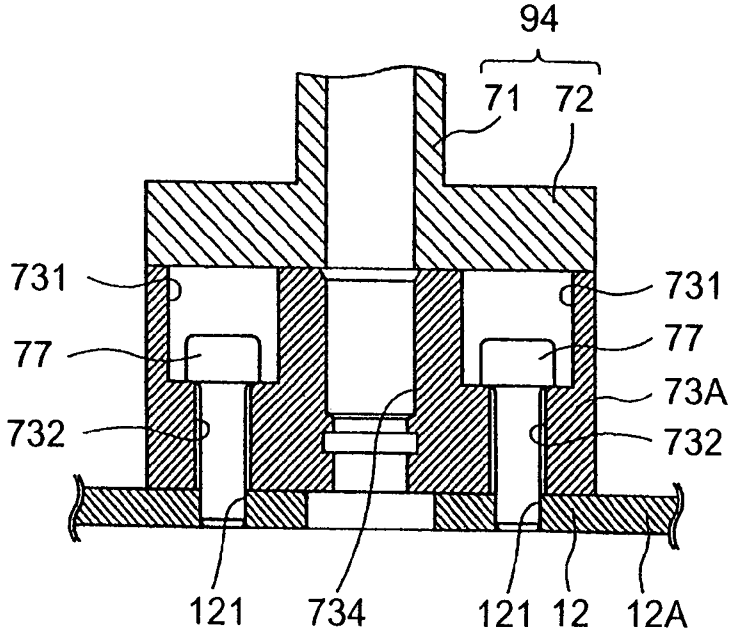
FIG. 5 is an enlarged sectional view of a connection portion between an airtight container and a pipe according to a second embodiment of the present invention.

FIG. 5 is an enlarged sectional view of a connection portion between an airtight container 12A and a refrigerant introduction pipe 94 according to a second embodiment of the present invention. A connection portion of the airtight container 12A with a refrigerant discharge pipe 96 is similar in structure to the above.

According to the embodiment, a structure between the container main body 12A and a connection sleeve 73, and a structure between the connection sleeve 73 and the refrigerant introduction pipe 94 are different from those of the first embodiment. That is, according to the embodiment, a connection sleeve 73A is made of aluminum as in the case of the airtight container 12A. No gasket is disposed between the container main body 12A and the connection sleeve 73A. An end surface of the connection sleeve 73A on the airtight container 12A side is crushed by the airtight container 12A to be bonded thereto. No gasket is disposed between the connection sleeve 73 and the refrigerant introduction pipe 94. An end surface of the connection sleeve 73A on the refrigerant introduction pipe 94 side is crushed by a flange portion of the refrigerant introduction pipe 94 to be bonded to the airtight container 12A.

Thus, since the airtight container 12A and the connection sleeve 73A are made of aluminum, the connection sleeve 73A is pressed to the airtight container 12A to crush a part thereof, and the connection sleeve 73A is bonded to the airtight container 12A. Accordingly, it is possible to prevent leakage of a refrigerant of the airtight container 12A through an aperture between the connection sleeve 73A and the airtight container 12A to the outside. Additionally, the refrigerant introduction pipe 94 is pressed to the connection sleeve 73A to crush a part thereof, and the connection sleeve 73A is bonded to the refrigerant introduction pipe 94. Accordingly, even when the refrigerant of the airtight container 12A leaks to a sleeve hole portion 731, it is possible to prevent leakage of the refrigerant through an aperture between the connection sleeve 73A and the refrigerant introduction pipe 94 to the outside.

The present invention is not limited to the foregoing embodiments, and modifications, improvements and the like which can achieve the object of the invention are also within the invention. For example, according to the first embodiment, the gasket 76 is disposed between the container main body 12A and the connection sleeve 73. However, the invention is not limited to this. That is, no gasket needs be disposed as long as the connection sleeve 73 can be bonded to the container main body 12A. Similarly, according to the embodiment, the gasket 75 is disposed between the connection sleeve 73 and the refrigerant introduction pipe 94. However, the invention is not limited to this. That is, no gasket needs be disposed as long as the refrigerant introduction pipe 94 can be bonded to the connection sleeve 73.

Furthermore, according to the embodiment, the rotary compressor 10 is a 2-stage compression system. However, the invention is not limited to this. That is, the rotary compressor may be a single state (1 stage) compression system or a compression system of 3 stages or more. For example, the rotary compressor of the single stage compression system is constituted in such a manner that a refrigerant is introduced from the outside, the introduced refrigerant is compressed by a compression element and discharged into an airtight container, and the refrigerant is discharged from the airtight container to the outside.

Third Embodiment

Figure 6:
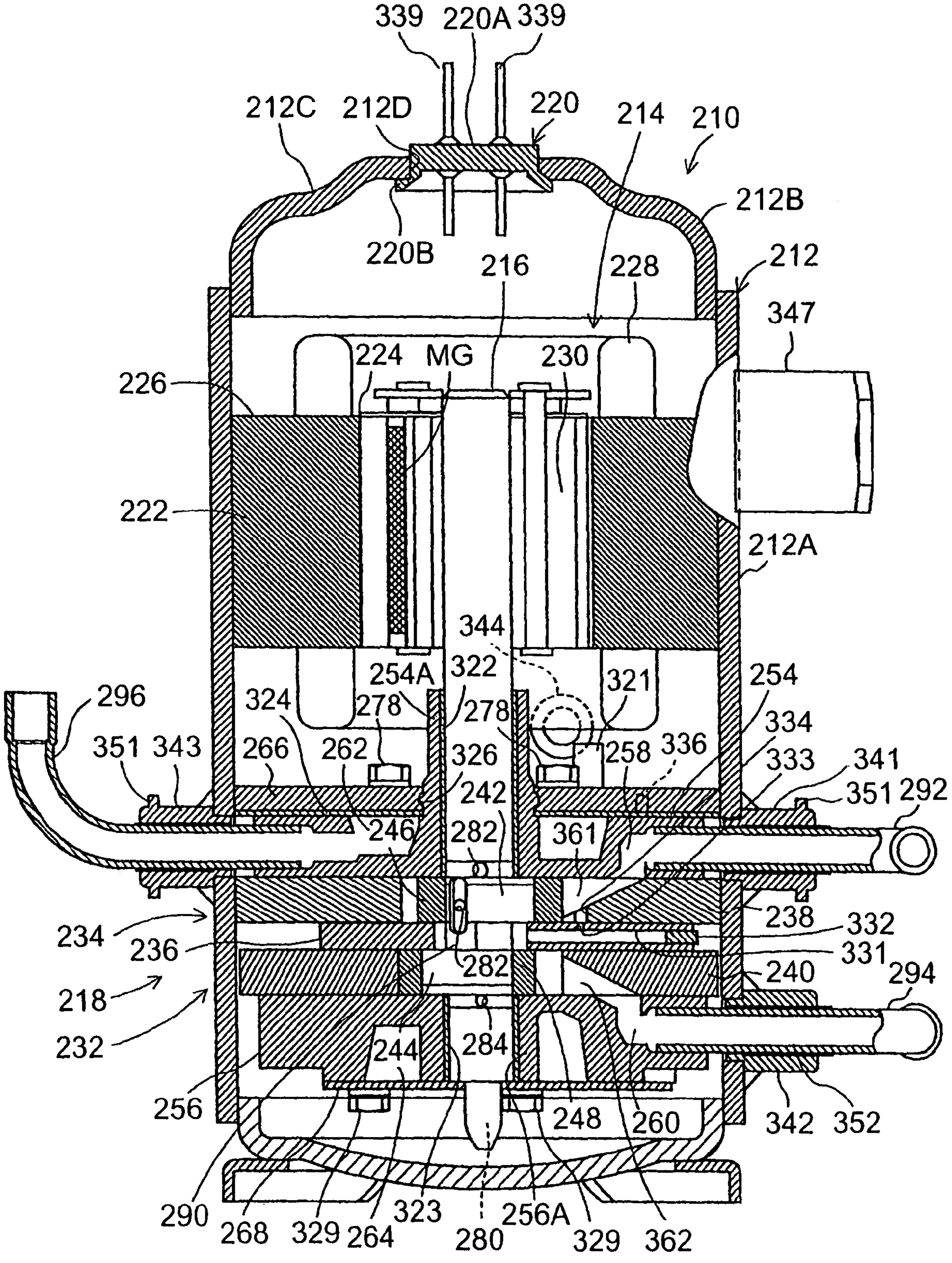
FIG. 6 is a vertical sectional view showing a compressor according to another embodiment (third embodiment) of the present invention.

Next, another embodiment of the present invention will be described with reference to the drawings. FIG. 6 is a vertical sectional view showing a rotary compressor 210 as a compressor of an internal intermediate pressure type multistage (2 stage) compression system which comprises first and second rotary compression elements 232, 234 according to an embodiment of the invention.

The rotary compressor 210 is a rotary compressor of an internal intermediate pressure type multistage compression system which uses carbon dioxide ($CO_2$) for a refrigerant. This rotary compressor 210 comprises a cylindrical airtight container 212 made of aluminum, an electric element 214 received in an upper side of an internal space of the airtight container 212, and a rotary compression mechanism section 218 as a compression element received in a lower side of the internal space of the airtight container 212.

Specifically, a height of the rotary compressor 210 is 220 mm (outer diameter 120 mm), a height of the electric element 214 is about 80 mm (outer diameter 110 mm), and a height of the rotary compression mechanism section 218 is about 70 mm (outer diameter 110 mm). A space between the electric element 214 and the rotary compression mechanism section 218 is about 5 mm.

Figure 7:
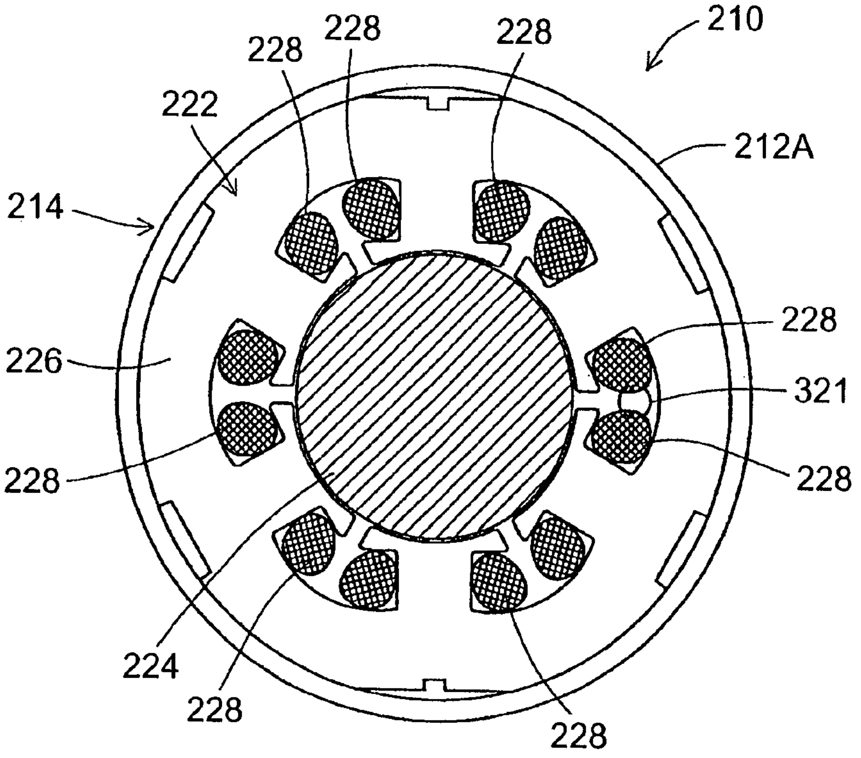
FIG. 7 is a cross sectional view of an electric element which constitutes the compressor of the embodiment.

As shown in FIG. 7, the electric element 214 comprises a stator 222 annularly formed along an inner peripheral surface of an upper space of the airtight container 212, and a rotor 224 rotatably disposed through a slight aperture inside the stator 222. The rotor 224 has a rotary shaft 216 extended through its rotational center in an axial direction.

The stator 222 has a laminated member 226 in which doughnut-shaped electromagnetic steel plates are stacked, and a stator coil 228 wound on a tooth portion of the laminated member 226 by series winding (concentrated winding). The rotor 224 comprises a laminated member 230 in which electromagnetic steel plates are stacked as in the case of the stator 222, and a permanent magnet MG arranged in the laminated member 230.

On the other hand, the rotary compression mechanism section 218 comprises first and second rotary compression elements 232 (1st stage) and 234 (2nd stage) driven by the electric element 214, an upper support member 254 and an upper cover 266 arranged on an upper side of the second rotary compression element 234, an intermediate partition plate 236 arranged between the first and second rotary compression elements 232, 234, and a lower support member 256 and a lower cover 268 arranged on a lower side of the first rotary compression element 232 to serve also as bearings of the rotary shaft 216. A displacement volume of the second rotary compression element 234 is smaller than that of the first rotary compression element 232.

Figure 8:
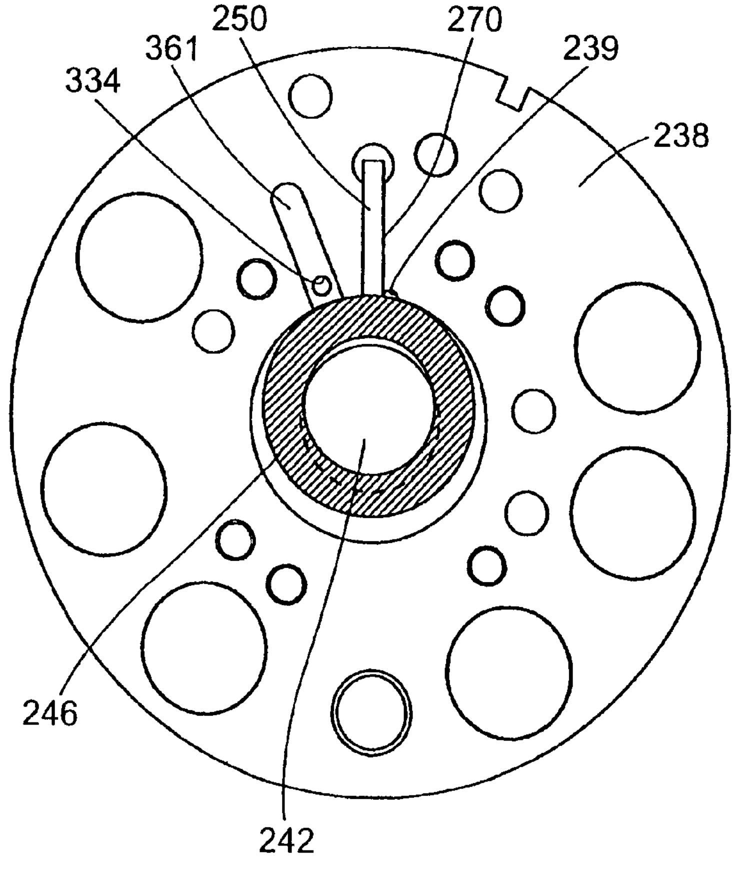
FIG. 8 is a cross sectional view of a second rotary compression element which constitutes the compressor of the embodiment.

As shown in FIG. 8, the second rotary compression element 234 comprises an upper cylinder 238, an upper eccentric portion 242 arranged in the upper cylinder 238 and fixed to the rotary shaft 216, an upper roller 246 fitted around the upper eccentric portion 242, and an upper vane 250 (described later) brought into contact with the upper roller 246 to divide the inside of the upper cylinder 38 into low-pressure and high-pressure chamber sides. In the upper cylinder 238, a suction port 361 is formed to communicate a suction passage 258 (described later) of the upper support member 254 with the low-pressure chamber side.

According to the second rotary compression element 234, a refrigerant gas is sucked from the low-pressure side of the upper cylinder 238 into the cylinder. In this state, the rotary shaft 216 is rotated to cause eccentric rotation of the upper eccentric portion 242 and the upper roller 246, whereby a space in the cylinder which has sucked the refrigerant gas is reduced. As a result, the refrigerant gas is compressed to become a high pressure, and discharged from the high-pressure side of the upper cylinder 238.

The upper support member 254 comprises the suction passage 258 connected to the suction port 361 of the upper cylinder 238, and a discharge muffling chamber 262 formed to be recessed on the upper side and connected through a discharge port 239 (see FIG. 8) to the high-pressure chamber side of the upper cylinder 238. Incidentally, in the upper support member 254, a discharge valve is disposed to open/close the discharge port 239.

A bearing 254A is erected in the center of the upper support member 254. A cylindrical bush 322 is fixed to an inner surface of the bearing 254A. The bush 322 is made of a material of good sliding characteristics.

The upper cover 266 is made of aluminum, and closes the discharge muffling chamber 262 of the upper support member 254. Accordingly, the discharge muffling chamber 262 is separated from the electric element 214 side in the airtight container 212. This upper cover 266 is formed into a roughly doughnut shape having a hole formed through which the bearing 254A of the upper support member 254 is put. The upper cover 266 is fixed to the upper support member 254 in a state in which a gasket 324 with a bead is held with the upper support member 254. The upper cover 266 is brought into contact with the inner peripheral surface of the airtight container 212, and fixed thereto by welding.

An O ring 326 is disposed between the inner peripheral edge of the upper cover 266 and the outer surface of the bearing 254A. Gas leakage from the discharge muffling chamber 262 can be prevented by this O ring 326 to increase a volume thereof. It is not necessary to fix the inner peripheral edge side of the upper cover 266 to the bearing 254A by a C ring.

A thickness of the upper cover 266 is 2 mm or higher to 10 mm or lower (most preferably 6 mm according to the embodiment). By setting the upper cover 266 to such a thickness, it is possible to achieve miniaturization while sufficiently enduring pressure of the discharge muffling chamber 262 which becomes higher than that in the airtight container 212, and to secure an insulation distance from the electric element 214.

The first rotary compression element 232 comprises a lower cylinder 240, a lower eccentric portion 244 fixed to the rotary shaft 216 by a phase difference of 180° from the upper eccentric portion 242 in the lower cylinder 240, a lower roller 248 fitted around the lower eccentric portion 244, and a lower vane (not shown) brought into contact with the lower roller 248 to divide the inside of the lower cylinder 240 into low-pressure and high-pressure chamber sides. In the lower cylinder 240, a suction port 362 is formed to communicate a suction passage 260 (described later) of the lower support member 256 with the low-pressure chamber side.

According to the first rotary compression element 232, a refrigerant gas is sucked from the low-pressure side of the lower cylinder 240 into the cylinder. In this state, the rotary shaft 216 is rotated to cause eccentric rotation of the lower eccentric portion 244 and the lower roller 248, whereby a space in the cylinder which has sucked the refrigerant gas is reduced. As a result, the refrigerant gas is compressed to become a high pressure, and discharged from the high-pressure side of the lower cylinder 240.

The lower support member 256 comprises the suction passage 260 connected to the suction port 362 of the lower cylinder 240, and a discharge muffling chamber 264 formed to be recessed on the lower side and connected through a discharge port to the high-pressure chamber side of the lower cylinder 240. Incidentally, in the lower support member 256, a discharge valve is disposed to open/close the discharge port.

A bearing 256A is formed through the center of the lower support member 256, and a cylindrical bush 323 is fixed to an inner surface of the bearing 256A. As in the case of the bush 322, the bush 323 is made of a material of good sliding characteristics. The rotary shaft 216 is held by the bearing 254A of the upper support member 254 and the bearing 256A of the lower support member 256 through the bushes 322, 323.

The lower support member 256 is made of an iron sintered material (or cast). A surface (lower surface) to which the lower cover 268 is mounted is processed to a degree of flatness 0.1 mm or lower, and then subjected to steam treatment. The surface to which the lower cover 268 is mounted becomes iron oxide by the steam treatment, and thus a hole in the sintered material is closed to improve sealing. Accordingly, no gasket needs be disposed between the lower cover 268 and the lower support member 256.

The lower cover 268 closes the discharge muffling chamber 264 of the lower support member 256. The lower cover 268 is made of a doughnut-shaped circular steel plate, and fixed to the lower support member 256. An inner peripheral edge of the lower cover 268 projects inward from the inner surface of the bearing 256A of the lower support member 256. Accordingly, a lower end surface of the bush 323 is held by the lower cover 268 to be prevented from falling off.

The upper and lower cylinders 238, 240, the intermediate partition plate 236, the upper and lower support members 254, 256, and the upper and lower covers 266, 268 are fastened from the upper and lower sides by four main bolts 278 and 329. That is, the main bolt 278 is inserted from the upper cover 266 side, and its tip is engaged with the lower support member 256. The main bolt 329 is inserted from the lower cover 268 side, and its tip is engaged with the upper support member 254.

Further, the upper and lower cylinders 238, 240, the intermediate partition plate 236, and the upper and lower support members 254, 256 are fastened by auxiliary bolts 336 positioned outside the main bolts 278, 329. The auxiliary bolt 336 is inserted from the upper support member 254 side, and its tip is engaged with the lower support member 256. Additionally, the auxiliary bolt 336 is positioned near a guide groove 270 (described later) of the upper vane 250.

Thus, since the rotary compression mechanism section 18 is integrated by the auxiliary bolts 336, 336 in addition to the main bolts 278, 329, sealing thereof can be secured, the vicinity of the guide groove 270 of the upper vane 250 can be fastened, and leakage of pressure applied to the upper vane 250 can be prevented.

In the upper and lower cylinders 238, 240 and the intermediate partition plate 236, a communication path is formed to communicate the discharge muffling chamber 264 of the lower support member 256 with the upper side of the upper cover 266 in the airtight container 212. An intermediate discharge pipe 321 is erected in an upper end of the communication path. This intermediate discharge pipe 321 is extended toward an aperture between the adjacent stator coils 228 wound on the stator 222 of the electric element 214. Thus, it is possible to suppress an increase in temperature of the electric element 214 by actively supplying a refrigerant gas of a relatively low temperature thereto.

Figure 9:
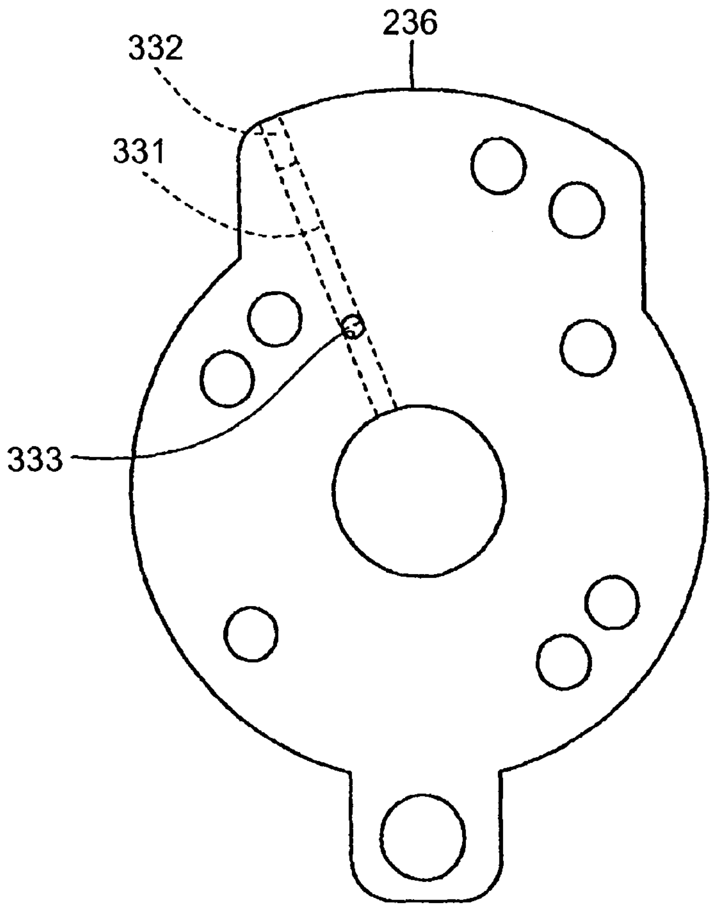
FIG. 9 is a cross sectional view of an intermediate partition plate which constitutes the compressor of the embodiment.

In the rotary shaft 216, an oil hole 280 is formed to be extended in the axial direction, and oil supply holes 282, 284 are formed to be extended from the oil hole 280 in an axial intersection direction. The oil supply holes 282, 284 are extended to outer peripheral surfaces of the upper and lower eccentric portions 242, 244 of the rotary compression elements 232, 234. An inner peripheral surface side of the intermediate partition plate 236 is communicated with the outer peripheral surfaces of the upper and lower eccentric portions 242, 244. In the intermediate partition plate 236, as shown in FIG. 9, a through-hole 331 is bored to communicate the outer peripheral surface with the inner peripheral surface, and a sealing material 332 is pressed into the outer peripheral surface side of the through-hole 331 to seal the same. Additionally, a communication hole 333 is bored to be extended upward in the midway of the through-hole 331. On the other hand, in the suction port 361 of the upper cylinder 238, a communication hole 334 is bored to be connected to the communication hole 333 of the intermediate partition plate 236.

As described later, since intermediate pressure is set in the airtight container 212, and pressure therein becomes higher than that in the upper cylinder 238, supplying of oil into the upper cylinder 238 becomes difficult. However, according to the aforementioned oil supply mechanism, the oil is drawn up from an oil reservoir of the bottom in the airtight container 212 to rise through the oil hole 280, and supplied through the oil supply holes 282, 284, the through-hole 331 of the intermediate partition plate 236, and the communication holes 333, 334 to the suction port 361 of the upper cylinder 238.

As the refrigerant, the carbon dioxide ($CO_2$) which is a natural refrigerant friendly to the global environment is used in consideration of combustibility, toxicity and the like. As the oil (lubricant oil), existing oil such as mineral oil, alkylbenzene oil, ether oil, or ester oil is used.

Figure 10:
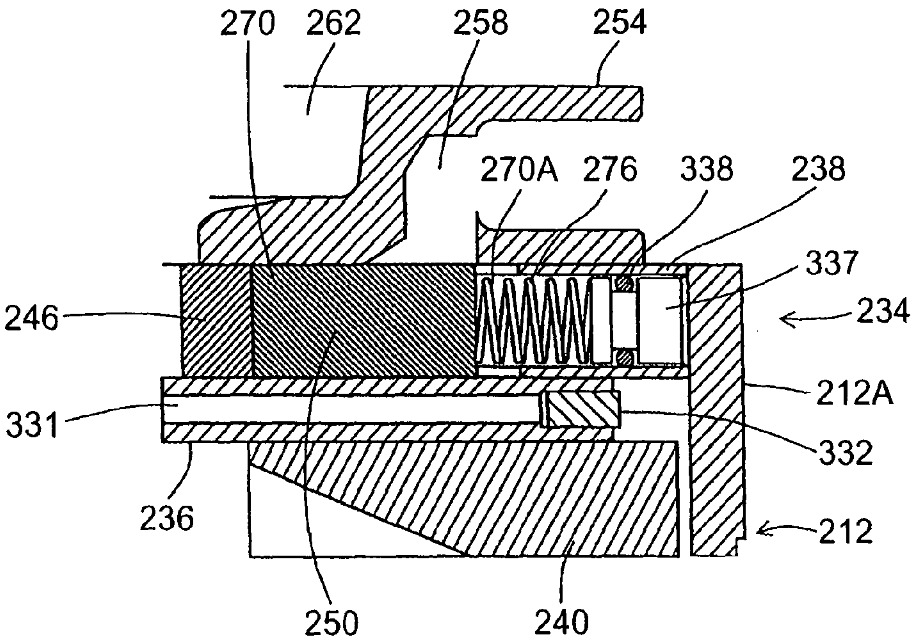
FIG. 10 is a vertical sectional view of the second rotary compression element which constitutes the compressor of the embodiment.

Now, the second rotary compression element 234 will be described. A constitution of the first rotary compression element 232 is substantially similar. That is, as shown in FIG. 10, in the upper cylinder 238 of the second rotary compression element 234, a guide groove 270 extended from an inner peripheral surface (upper roller 246 side) to an outer peripheral side, and a housing portion 270A which communicates the outer peripheral side of the guide groove 270 with the outer peripheral surface (container main body 212A side of the airtight container 212) are formed.

The upper vane 250 is received in the guide groove 270, and the housing portion 270A houses a spring 276, and a metal plug 337 which prevents the pulling-out of the spring 276 to the airtight container 212 side. Accordingly, the spring 276 always presses the upper vane 250 to the upper roller 246 side. High pressure which is discharge pressure of the second rotary compression element 234 is applied as back pressure to the guide groove 270 from a back pressure chamber (not shown). Thus, the spring 276 side of the plug 337 becomes high pressure, and the airtight container 212 side becomes intermediate pressure.

An outer size of the plug 337 is set smaller than an inner diameter of the housing portion 270A, and the plug 337 is fitted in the housing portion 270A with an aperture. An O ring 338 is mounted to an outer peripheral surface of the plug 337, and the aperture between the plug 337 and the housing portion 270A is sealed. A size from an inner end of the plug 337 to the O ring 338 is set larger than a space between an outer end of the plug 337 and the container main body 212A of the airtight container 212.

Thus, as in the case of the pressing-in and fixing of the plug 337 in the housing portion 270A, it is possible to prevent a problem of performance deterioration caused by a drop in sealing between the upper cylinder 238 and the upper support member 254 due to deformation of the upper cylinder 238. Besides, even when the high pressure of the spring 276 side pushes the plug 337 from the housing portion 270A to the outside to come into contact with the airtight container 212, the O ring 338 still seals the aperture between the plug 337 and the housing portion 270A.

A portion of the rotary shaft 216 that connects the upper eccentric portion 242 to the lower eccentric portion 244 is a connection portion 290. A sectional shape of this connection portion 290 is elliptical, and a sectional area thereof is larger compared with the other portions of the rotary shaft 216 circular in section. That is, the sectional shape of the connection portion 290 is thicker in the eccentric direction of the upper and lower eccentric portions 242, 244.

Accordingly, sectional second moment of the connection portion 290 is set larger than those of the other potions of the rotary shaft 216 to secure strength (rigidity), whereby durability and reliability can be improved. As a result, deformation of the rotary shaft 216 can be prevented even when a refrigerant of a large difference between high pressure and low pressure is used to enlarge a load on the rotary shaft 216.

The airtight container 212 is made of aluminum, and comprises the cylindrical container main body 212A which receives the electric element 214 and the rotary compression mechanism section 218, a bottom portion which is an oil reservoir to close a bottom opening of the container main body 212A, and a roughly bowl-shaped end cap (cap member) 212B which closes an upper opening of the container main body 212A.

The end cap 212B comprises an annular step portion 212C formed by buckling extrusion molding and having a predetermined curvature, and a circular mounting hole 212D formed in the center. A terminal (wiring is omitted) 220 is mounted to the mounting hole 212D to supply power to the electric element 214. This terminal 220 comprises a circular glass portion 220A through which an electric terminal 339 is fixed, and a metal mounting portion 220B formed around the glass portion 220A and bulged in a jaw shape obliquely outward and downward. A thickness of the mounting portion 220B is set to 2.4±0.5 mm. The terminal 220 inserts the glass portion 220A into the mounting hole 212D from the lower side to be exposed to the upper side, and brings the mounting portion 220B into contact with a peripheral edge of the mounting hole 212D. In this state, the peripheral edge of the mounting hole 212D of the end cap 212B and the mounting portion 220B are welded together, and thus the terminal 20 is fixed to the end cap 212B.

An accumulator that separates a gas from a liquid of a sucked refrigerant is mounted through a bracket 347 to the airtight container 212.

In the outer surface of the container main body 212A of the airtight container 212, a sleeve 343 through which the refrigerant introduction pipe 294 is inserted, sleeves 341, 344 through which the refrigerant introduction pipe 292 is inserted, and a sleeve 343 through which the refrigerant discharge pipe 296 is inserted are disposed. Specifically, the sleeves 341, 342, 343 and 344 are cylindrical, and fixed to the container main body 212A by welding. The sleeves 341 and 342 are adjacent to each other up and down, and the sleeve 343 is roughly on a diagonal line of the sleeve 341. The sleeve 344 is in a position shifted from the sleeve 341 by about 90°.

Jaw portions 351 are formed in tip outer peripheries of the sleeves 341, 343 and 344, and a screw groove (not shown) is formed in an inner periphery of the sleeve 342. A coupler for airtight test pipe connection can be detachably engaged with the jaw portion 351, and a connector for airtight test pipe connection can be fixed in the screw groove by a screw. Thus, since an airtight test pipe from a compressed air generator (not shown) can be easily connected by using the coupler or the connector, an airtight test can be finished within a short time. Especially, in the case of the sleeves 341 and 342 adjacent to each other up and down, since the jaw portion 351 is formed in one sleeve 341 while the screw groove is formed in the other sleeve 342, there is no need to adjacently mount a coupler relatively large compared with the connector, and a space between the sleeves 341 and 342 can be narrowed.

One end of the refrigerant introduction pipe 294 is connected through the sleeve 342 to the suction passage 260 of the lower support member 256, and the other end is connect to a lower end of the accumulator. One end of the refrigerant introduction pipe 292 is connected through the sleeve 341 to the suction passage 258 of the upper support member 254, and the other end is connected through the sleeve 344 to the electric element 214 side in the airtight container 212. The refrigerant discharge pipe 296 is connected through the sleeve 343 to the discharge muffling chamber 262 of the upper support member 254.

Figure 11:
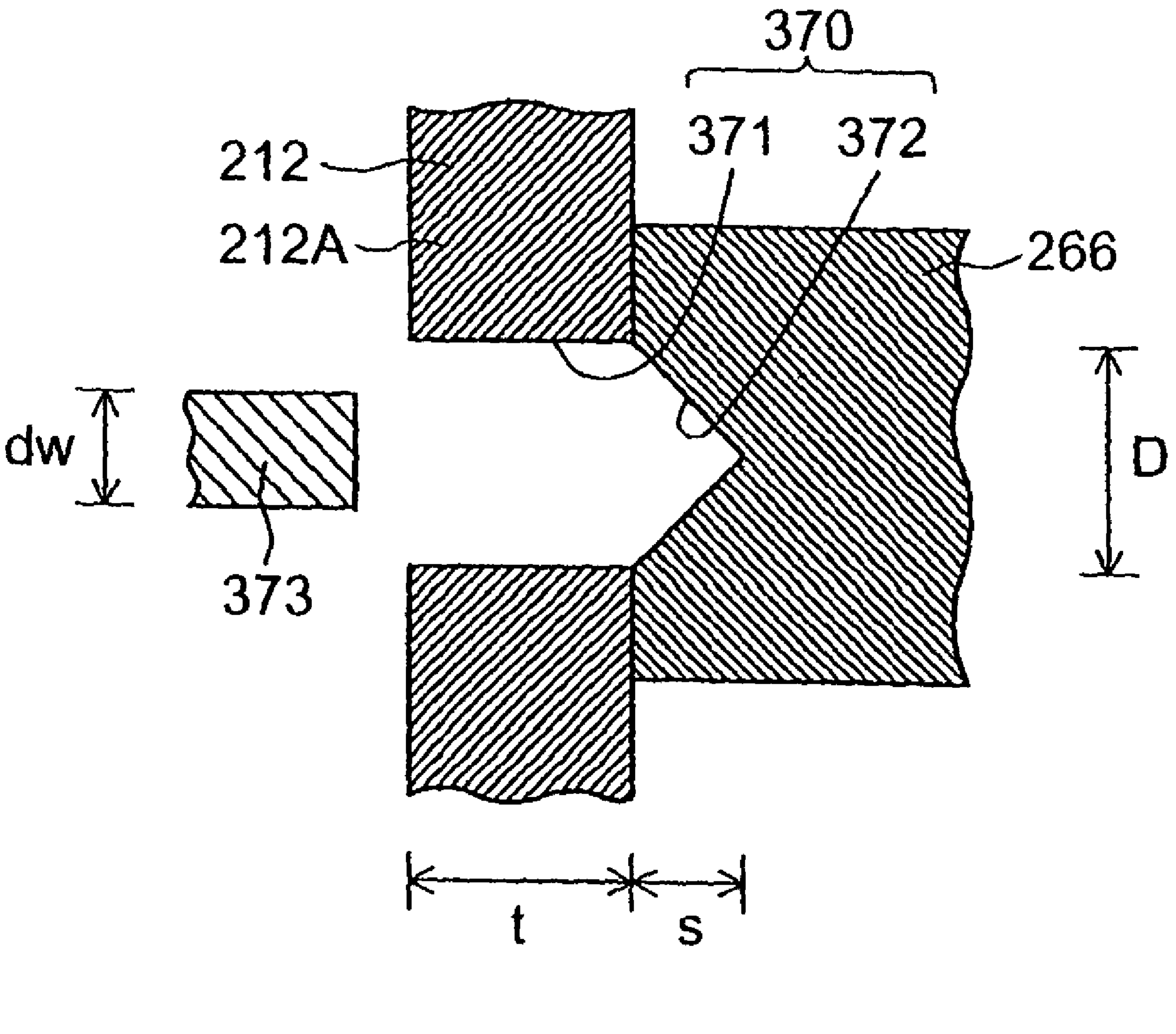
FIG. 11 is an enlarged sectional view illustrating a method of welding together the airtight container and the compression which constitute the compressor of the embodiment.

Next, a process of welding the rotary compression mechanism section 218 to the airtight container 212 will be described with reference to FIG. 11. First, by shrinkage-fitting, the upper cover 266 of the rotary compression mechanism section 218 is brought into contact with the inside of the container main body 212A of the airtight container 212.

Next, a through-hole 370 which penetrates the container main body 212A and reaches a predetermined depth of the upper cover 266 from the outside of the container main body 212A is formed by a drill whose tip is conical. The through-holes 370 have hole diameters D, and formed at predetermined intervals along a contract surface between the container main body 212A and the upper cover 266, specifically in an outer peripheral direction of the container main body 212A. Accordingly, a through-hole 371 that has a plate thickness t of the container main body 212A, i.e., a depth t, is formed in the container main body 212A. In the upper cover 266, a bowl-shaped hole portion 372 that has a predetermined depth s is formed.

Subsequently, an arc is generated between a wire 373 having an outer diameter dw and the through-hole 370 in an atmosphere of an inactive gas such as an argon gas, droplets are dropped into the through-hole 370 from the wire 373, and the container main body 212A and the upper cover 266 are welded together.

Incidentally, according to the embodiment, the outer diameter dw of the wire 373 is 1.6 mm, the plate thickness of the container main body 212A is 5.0 mm, the hole diameter D of the through-hole 370 is 5.0 mm, the depth s of the hole portion 372 is 2.0 mm, and welding places are 4.

Thus, since the hole of a predetermined depth is formed beforehand in the compression element, a metal lump can be easily formed by the droplets even when the compression element is not sufficiently melted. As a result, even when the compression element or the airtight container is made of a low-melting point metal, the compression element can be surely fixed to the airtight container.

Since the container main body 212A and the rotary compression mechanism section 218 are made of aluminum, it is possible to reduce weight while securing strength and rigidity of the rotary compressor 210. The outer diameter dw of the wire 373 is set to 1.6 mm or lower, and the hole diameter D of the through-hole 370 is set to 5.0 mm. Accordingly, the through-hole 370 can be surely closed by the droplets from the wire 373, and the rotary compression mechanism section 218 can be surely welded to the container main body 212A.

The depth s of the hole portion 372 formed in the upper cover 266 is set to 2.0 mm. Thus, enough droplets that enter the hole portion 372 of the upper cover 266 can be secured. As a result, the rotary compression mechanism section 218 can be welded to the container main body 212A more surely. Additionally, since the through-holes 370 are formed at the predetermined intervals along the contact surface between the container main body 212A and the upper cover 266, the rotary compression mechanism section 218 can be fixed along the contact surface with the container main body 212A by a uniform force.

Figure 12:
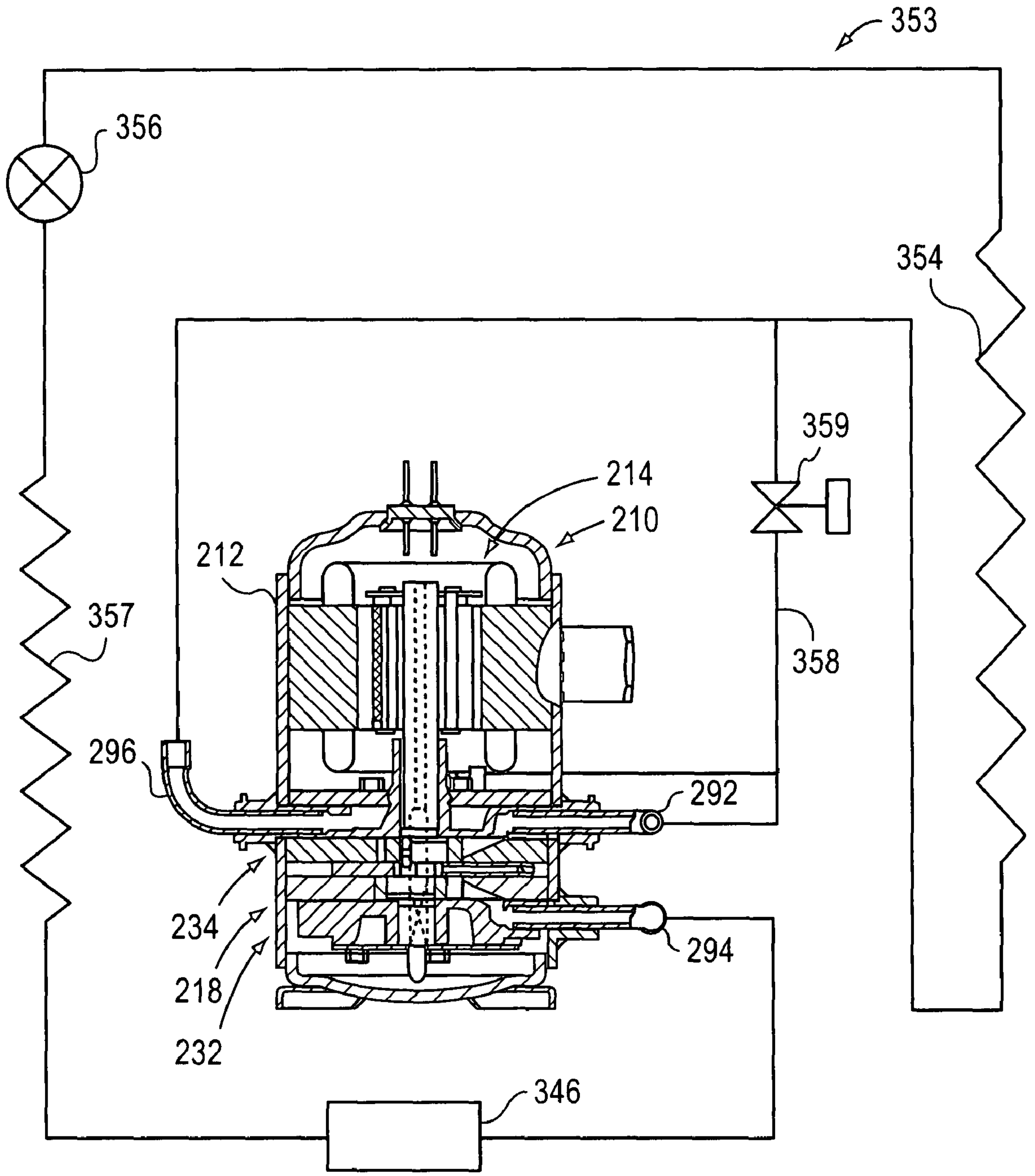
FIG. 12 is a schematic view of a water heat to which the compressor of the embodiment is applied.

FIG. 12 shows a water heater 353 to which the aforementioned rotary compressor 210 is applied. The water heater 353 comprises a hot water tank (not shown) having a gas cooler 354, an evaporator 357, an accumulator 346, and the rotary compressor 210.

The refrigerant discharge pipe 296 connected to the rotary compressor 210 is connected to the gas cooler 354 which heats water. The gas cooler 354 and the evaporator 357 are connected to each other through an expansion valve 356 as a pressure reducing device by a pipe. The evaporator 357 is connected to the accumulator 346 by a pipe. The accumulator 346 is connected to the refrigerant introduction pipe 294 connected to the rotary compressor 210. The refrigerant introduction pipe 292 and the refrigerant discharge pipe 296 are connected to each other through a solenoid valve 359 as a flow path control device by a defrosting pipe 358 which constitutes a defrosting circuit.

Next, an operation of the water heater 353 will be described with reference to FIGS. 6 and 11. The solenoid valve 359 is closed during heating and running.

First, when power is supplied to the stator coil 228 of the electric element 214 through the terminal 220 and the wiring (not shown), the electric element 214 is started to rotate the rotor 224. Accordingly, the upper and lower rollers 246, 248 of the rotary compression elements 232, 234 are eccentrically rotated in the upper and lower cylinders 238, 240 by the rotary shaft 216 and the upper and lower eccentric portions 242, 244.

Then, the low-pressure (1st stage suction pressure LP: 4 MPaG) refrigerant gas in the refrigerant introduction pipe 294 is sucked into the rotary compressor 210. Specifically, the refrigerant gas is passed through the suction passage 260 of the lower support member 256 and sucked from the suction port 362 into the low-pressure chamber side of the lower cylinder 240. The sucked low-pressure refrigerant gas is compressed by the operations of the lower roller 248 and the vane of the first rotary compression element 232 to become a refrigerant gas of intermediate pressure (1st stage discharge pressure MP1:8 MPaG). The refrigerant gas of intermediate pressure is passed from the high-pressure chamber side of the lower cylinder 240 through the discharge port, the discharge muffling chamber 264 of the lower support member 256, the communication path, and the intermediate discharge pipe 321, and discharged into the airtight container 212.

The refrigerant gas of intermediate pressure in the airtight container 212 is passed through the refrigerant introduction pipe 292, the suction passage 258 of the upper support member 254, and the suction port 361, and sucked into the low-pressure chamber side of the upper cylinder 238 (2nd stage suction pressure MP2:8 MPaG). The sucked refrigerant gas of intermediate pressure is further compressed by the operations of the upper roller 246 and the upper vane 250 of the second rotary compression element 234 to become a refrigerant gas of a high temperature and high pressure (2nd stage discharge pressure HP: 12 MPaG). The refrigerant gas of high pressure is passed from the high-pressure chamber side of the upper cylinder 238 through the discharge port 239, and the discharge muffling chamber 262 of the upper support member 254, and discharged into the refrigerant discharge pipe 296.

The refrigerant gas of the refrigerant discharge pipe 296 discharged from the rotary compressor 210 is raised to about +100° C., and flows into the gas cooler 354. The refrigerant gas of a high temperature and high pressure radiates heat in the gas cooler 354, heats water in the hot water tank, and generates hot water of about +90° C. As a result, the temperature of the refrigerant gas is lowered, and the pressure thereof is reduced through the expansion valve 356. Then, the refrigerant gas flows into the evaporator 357, passes through the accumulator 346, and flows into the refrigerant introduction pipe 294.

As described above, the refrigerant gas repeats a cycle of being sequentially circulated through the rotary compressor 210, the gas cooler 354, the evaporator 357, and the accumulator 346.

Incidentally, in an environment of a low outside temperature, for example, in winter, running of the water heater 353 causes frosting in the evaporator 357. In such a case, the solenoid valve 359 is opened, and the expansion valve 356 is fully opened to execute defrosting running of the evaporator 357. Accordingly, the refrigerant gas of intermediate pressure in the refrigerant introduction pipe 292 is passed through the defrosting pipe 358 to flow into the refrigerant discharge pipe 296, and then merges with a small amount of a refrigerant gas of high pressure in the refrigerant discharge pipe to flow into the gas cooler 354. A temperature of this refrigerant is about +50 to 60° C. No heat is radiated at the gas cooler 354, rather heat is absorbed. Then, the refrigerant gas that has become relative high in temperature in the gas cooler 354 is passed through the evaporation valve 356 to reach the evaporator 357. Thus, the evaporator 357 is heated to be defrosted since the relatively high-temperature refrigerant of roughly intermediate pressure flows thereinto.

Now, since the refrigerant of high pressure has been supplied to the evaporator 357 without being reduced in pressure to defrost the same, the suction pressure of the first rotary compression element 232 of the rotary compressor 210 rises, and the discharge pressure thereof becomes high. Accordingly, the suction pressure of the second rotary compression element 234 becomes roughly equal to its discharge pressure, creating a fear that a reverse phenomenon of pressure will occur between the suction side (low-pressure side) and the discharge side (high-pressure side) of the second rotary compression element 234. However, as described above, since the evaporator 357 is defrosted by using the refrigerant gas of intermediate pressure discharged from the first rotary compression element 232, it is possible to prevent the reverse phenomenon between the high pressure and the intermediate pressure.

The compressor is not limited to the rotary compressor of the internal intermediate pressure type multistage compression system of the embodiment. A rotary compressor of a single cylinder is within the invention. Further, according to the embodiment, the rotary compressor 210 is used for the refrigerant circuit of the water heater 353. Not limited to this, however, the rotary compressor 210 may be used for indoor heating.

The present invention is not limited to the embodiment, but modifications, improvements and the like which can achieve the object are also within the invention. For example, according to the embodiment, the container main body 212A of the airtight container 212 and the upper cover 266 of the rotary compression mechanism section 218 are made of aluminum, and the upper cover 266 is welded to the container main body 212A. However, the invention is not limited to this.

For example, the other constituting members of the rotary compression mechanism section 218, i.e., the first rotary compression element 232, the second rotary compression element 234, the upper support member 254, the upper cover 266, the intermediate partition plate 236, the lower support member 256, the lower cover 268 and the like may be made of aluminum, and welded to the container main body 212A. That is, the entire rotary compression mechanism section 2128 may be made of aluminum. Alternatively, the member of the rotary compression mechanism section 218 that is welded to the container main body 212A only is made of aluminum, while the other members may be made of iron. If the entire rotary compression mechanism section 218 is made of aluminum, weight reduction can be realized and it is therefore suitably used for an on-vehicle air conditioner or the like. For example, the upper cylinder 238 or the lower cylinder 240 may be made of aluminum, and welded to the container main body 212A.

Figure 13:
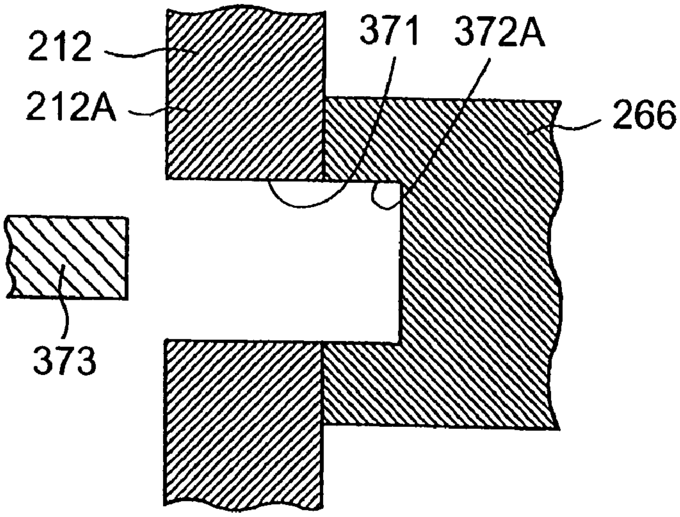
FIG. 13 is an enlarged sectional view illustrating a method of welding an airtight container and a compression element together according to a modified example of the present invention.
Figure 14:
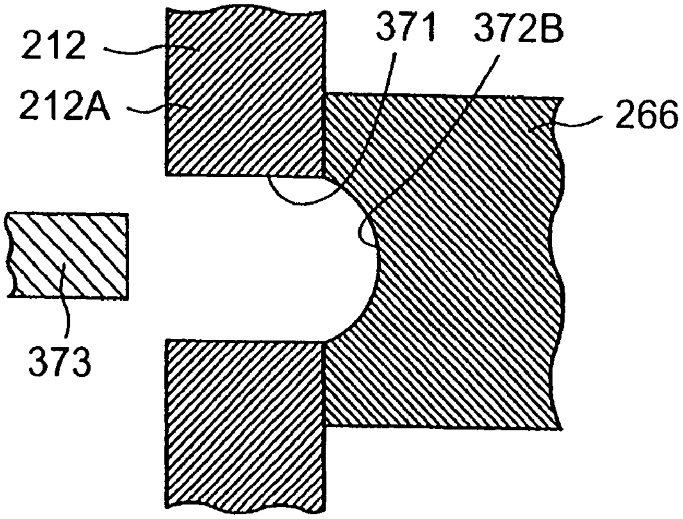
FIG. 14 is an enlarged sectional view illustrating the method of welding the airtight container and the compression element together according to the modified example of the present invention.

Furthermore, according to the embodiment, the bowl-shaped hole portion 2172 is formed by the drill whose tip is conical. However, the invention is not limited to this. That is, as shown in FIG. 13, a hole portion 372A having a flat bottom surface may be formed. Alternatively, as shown in FIG. 14, a hole portion 372B of a roughly semispherical shape may be formed.

Fourth Embodiment

Figure 15:
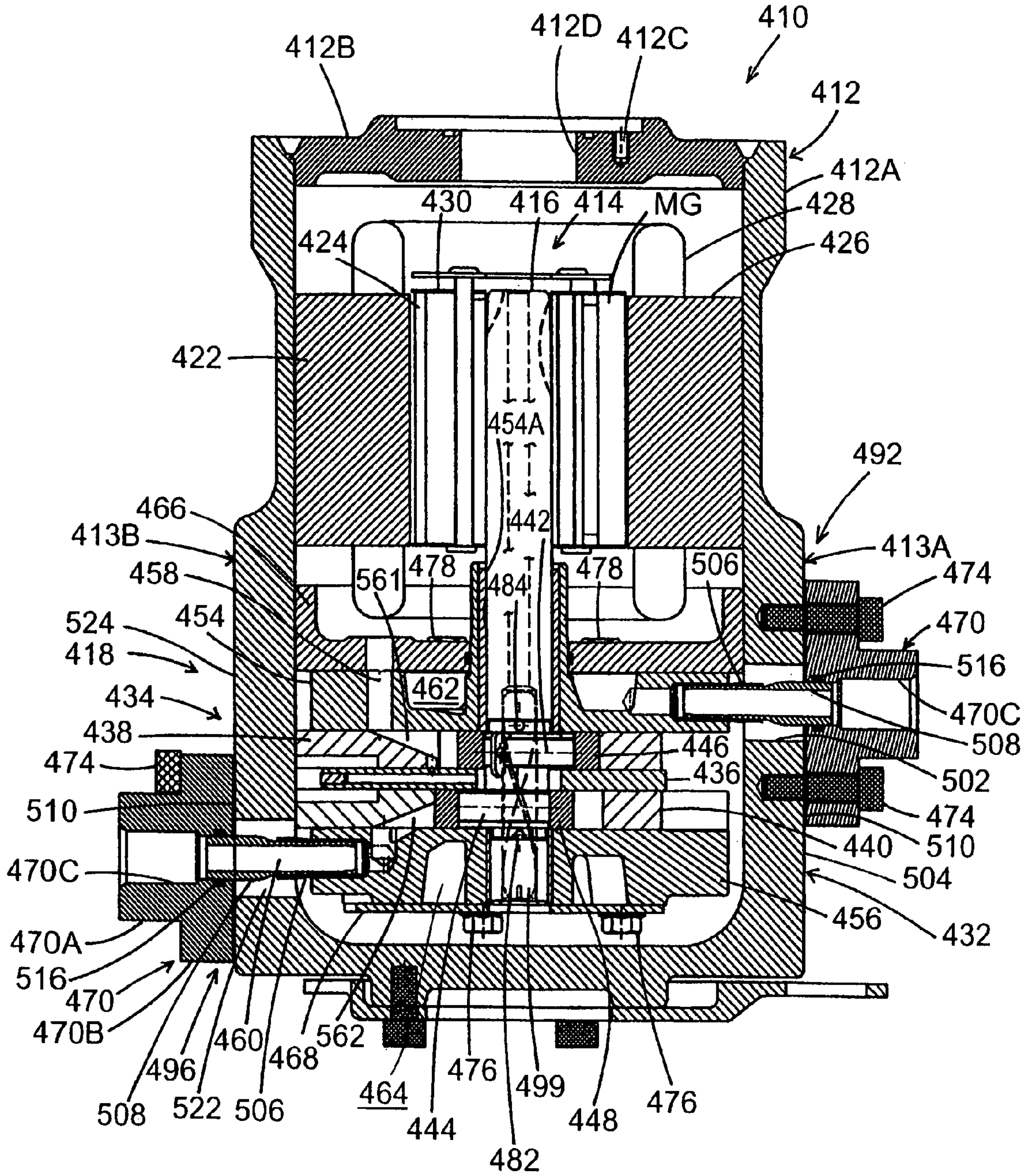
FIG. 15 is a vertical sectional view of a rotary compressor of an internal intermediate pressure type multistage (2 stage) compression system which comprises first and second rotary compression elements as a compressor according to yet another embodiment (fourth embodiment) of the present invention.

Next, yet another embodiment of the present invention will be described in detail with reference to the drawings. FIG. 15 is a vertical sectional view showing a rotary compressor 410 of an internal intermediate pressure type multistage (2 stage) compression system which comprises first and second rotary compression elements 432, 434 according to this embodiment.

In the drawing, a reference numeral 410 denotes a rotary compressor of an internal intermediate pressure type multistage (2 stage) compression system, and carbon dioxide ($CO_2$) is used for a refrigerant. This rotary compressor 410 comprises a cylindrical airtight container 412, an electric element 414 as a driving element received in an upper side of an internal space of the airtight container 412, and a rotary compression mechanism section 418 which is arranged below the electric element 414 and which comprises a first rotary compression element 432 (1st stage) and a second rotary compression element 434 (2nd stage) as first and second compression elements driven by a rotary shaft 416 of the electric element 414.

The airtight container 412 of the embodiment is made of an aluminum material, and comprises a container main body 412A which receives the electric element 414 and the rotary compression mechanism section 418, and a roughly thin bowl-shaped end cap (cap member) 412B which closes an upper opening of the container main body 412A. A circular mounting hole 412D is formed in an upper surface center of the end cap 412B. A terminal (wiring is omitted) an entire periphery of which is covered with a metal (iron) metal cover (not shown) having a plurality of bolt holes 412C formed on a peripheral portion to supply power to the electric element 414 is mouthed to the mounting hole 412D. In a state in which the end cap 412B is inserted into an upper end inner wall of the container main body 412A, the end cap is arc-welded from the outside to be fixed, thereby forming the airtight container 412.

The electric element 414 is a DC motor of a so-called polar concentrated winding system, and comprises a stator 422 annularly mounted along an inner peripheral surface of an upper space of the airtight container 412, and a rotor 424 inserted and installed through a slight aperture inside the stator 422. The rotor 424 is fixed to the rotary shaft 416 extended through a center in the airtight container 412 in a vertical direction. The stator 422 has a laminated member 426 constituted by stacking doughnut-shaped electromagnetic steel plates and shrinkage-fitted to an inner surface of the airtight container 412, and a stator coil 428 wound on a tooth portion of the laminated member 426 by series winding (concentrated winding). The rotor 424 comprises a laminated member 430 of electromagnetic steel plates as in the case of the stator 422, and a permanent magnet MG inserted into the laminated member 430.

An oil pump 499 is formed as oil supplying means in a lower end portion of the rotary shaft 416. By this oil pump 499, lubricant oil is drawn up from an oil reservoir formed in a bottom portion of the airtight container 412, passed through an oil hole (not shown) formed in an axial center of the rotary shaft 416 in a vertical direction, and supplied from horizontal oil supply holes 482, 484 (also formed in later-described upper and lower eccentric portions 442, 444) communicated with the oil hole to sliding portions or the like of the upper and lower eccentric portions 442, 444 and the first and second rotary compression elements 432, 434. Thus, abrasion prevention and sealing of the first and second rotary compression elements 432, 434 are implemented.

An intermediate partition plate 436 is held between the first and second rotary compression elements 432 and 434. That is, the first and the second rotary compression elements 432 and 434 comprise the intermediate partition plate 436, upper and lower cylinders 438, 440 arranged above and below the intermediate partition plate 436, upper and lower rollers 446, 448 eccentrically rotated by the lower and upper eccentric portions 442, 444 disposed in the rotary shaft 416 with a phase difference of 180° in the upper and lower cylinders 438, 440, vanes (not shown) brought into contact with the upper and lower rollers 446, 448 to divide the insides of the upper and lower cylinders 438, 440 into low-pressure and high-pressure chamber sides, and upper and lower support members 454 and 456 as support members to close an upper opening surface of the upper cylinder 438 and a lower opening surface of the lower cylinder 440, and to serve also as bearings of the rotary shaft 416.

The upper and lower support members 454 and 456 comprise suction passages 458, 460 communicated with the insides of the upper and lower cylinders 438, 440 through suction ports 561, 562, and discharge muffling chambers 462, 464 formed by being partially recessed and covering the recessed portions with upper and lower covers 466, 468.

The upper cover 466 is made of an aluminum material, and formed so that its outer peripheral surface can be brought into contact with an inner wall of the airtight container 412. The outer peripheral surface of the upper cover 466 is bent to rise in a longitudinal direction (axial direction of the rotary shaft, upper direction in the embodiment) as shown. The upper cover 466 is mounted to the airtight container 412 by tack-welding its bent and rising outer peripheral surface to the same.

The upper cover 466 closes the upper opening of the recess of the upper support member 454 to define the discharge muffling chamber 466 communicated with the inside of the upper cylinder 438 of the second rotary compression element 434 through the discharge port (not shown) in the upper support member 454. The electric element 414 is disposed at a specified interval from the upper cover 466 above the same. In this case, a lower end portion of the stator coil 428 of the electric element 414 is positioned between the bent and rising upper end portion of the outer peripheral surface of the upper cover 466 and the surface of the upper cover 466 which covers the discharge muffling chamber 462.

The upper cover 466 is made of a roughly doughnut-shaped circular aluminum plate having a circular through-hole (not shown) formed in the center. The upper support member 454 in which a bearing 454A of the rotary shaft 416 is disposed is inserted into the through-hole, and a peripheral portion thereof is fixed to the upper support member 454 from the upper sides by four main bolts 478. The main bolts 478 penetrate the upper support member 454, and tips thereof are engaged with the lower support member 456 to integrate the upper cover 466, the upper support member 454, the upper cylinder 438, the intermediate partition plate 436, the lower cylinder 440, and the lower support member 456. Incidentally, the lower cover 468 is fixed to the lower support member 456 by a bolt 476.

In the container main body 412A of the airtight container 412, a refrigerant discharge portion 492 and a refrigerant introduction portion 496 are formed in positions corresponding to the discharge muffling chambers 462 and 464 of the upper and lower support members 454, 456. For the refrigerant discharge portion 492, a thick portion 413A is integrally formed with the container main body 412A of the airtight container 412. For the refrigerant introduction portion 496, a thick portion 413B is integrally formed with the container main body 412A of the airtight container 412.

Figure 16:
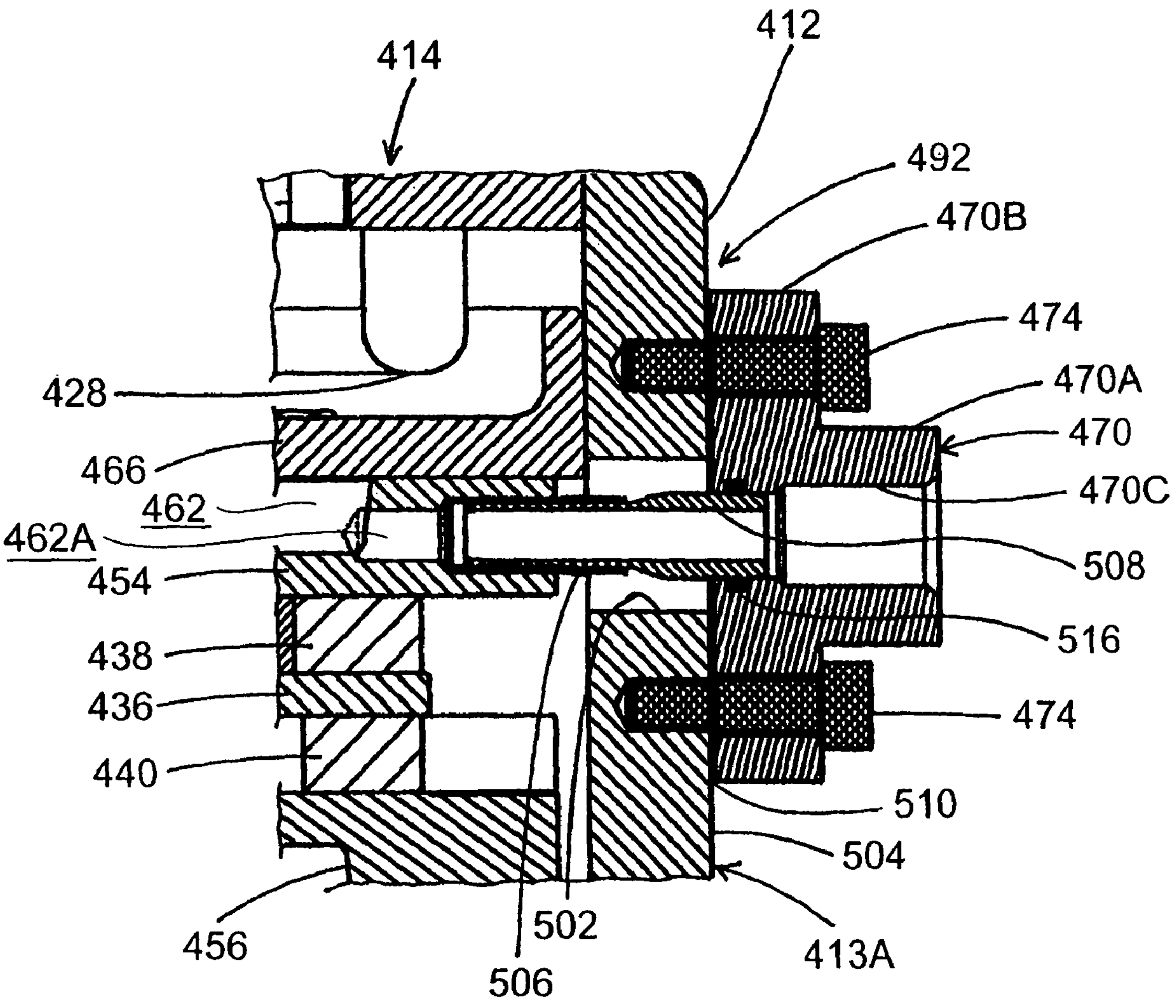
FIG. 16 is an enlarged view of main sections of the rotary compressor of FIG. 15.

A hole 502 is formed in the refrigerant discharge portion 492 of the airtight container 412 to communicate the inside thereof with the outside. In an outer surface of the cylindrical airtight container 412 which surrounds the hole 502, a flat surface 504 is formed on a plane of a predetermined range (FIG. 16). To discharge the refrigerant from the discharge muffling chamber 462 to the outside of the airtight container 412, a sleeve 470 that connects a hollow refrigerant pipe (not shown) made of a material such as copper, aluminum or brass is mounted to the hole 502. Incidentally, a diameter of the hole 502 is set larger by a predetermined size than a collar 508 so as to easily fit the collar 508 to a tube suction 506 (described later).

The sleeve 470 is made of a material similar to that of the refrigerant pipe, and the inside thereof exhibits a cylindrical shape to insert the refrigerant pipe. A connection portion 470A is disposed on one side of the sleeve 470, and a mounting portion 470B is disposed on the other side to fix the sleeve 470 to the airtight container 412 continuously after the connection portion 470A. The mounting portion 470B is formed larger in diameter than the connection portion 470A, and an insertion portion 470C through which the refrigerant pipe is inserted is formed in the sleeve 470.

A side of the mounting portion 470B opposed to the connection portion 470A is formed planar, and this planar portion can be bonded to the flat surface 504 of the airtight container 412. A stopper (not shown) is disposed in the insertion portion 470C formed in the sleeve 470 to disable insertion of the refrigerant pipe by a predetermined size or more. According to the embodiment, two screw holes (not shown) are formed in the mounting portion 470B to fix the sleeve 470. However, one (one screw) is enough for strength. In the thick portion 413A of the airtight container 412, a screw hole (not shown) is disposed in a position corresponding to the screw hole of the sleeve 470. This screw hole is formed with a depth which does not penetrate the thick portion 413A to prevent leakage of the refrigerant gas from the inside of the airtight container 412 to the outside.

The refrigerant pipe is inserted from the connection portion 470A side of the sleeve 470 into the insertion portion 470C until it comes into contact with the stopper, and the outer peripheral surface of the refrigerant pipe and the connection portion 470A are fixed to each other by welding. In a state in which the refrigerant pipe is welded and fixed to the connection portion 470A of the sleeve 470, one side of the tube suction 506 is fitted to the communication path 462A communicated from the hole 502 formed in the thick portion 413A of the airtight container 412 with the discharge muffling chamber 462 of the upper support member 454, and the collar 508 is fitted into the other side of the tube suction 506.

A groove (not shown) is formed in an inner peripheral surface (mounting portion 470B side) of the insertion portion 470C of the sleeve 470. An elastic O ring 516 (equivalent to sealing material of the invention) made of heat resistant synthetic rubber is engaged in the groove to prevent gas leakage between the insertion portion 470C and the collar 508. Additionally, between the flat surface 504 of the thick portion 413A disposed in the refrigerant discharge portion 492 of the airtight container 412 and the mounting portion 470B, a gasket 510 made of a flexible and soft metal plate is inserted to prevent gas leakage.

Then, the screw 474 is inserted from the screw hole disposed in the mounting portion 470B, and fastened into the screw hole disposed in the thick portion 413A of the airtight container 412. Accordingly, the sleeve 470 is fixed to the refrigerant discharge portion 492 of the airtight container 412. At this time, the collar 508 projects from the flat surface 504 of the airtight container 412 by a predetermined size, and is inserted into the insertion portion 470C of the sleeve 470 by a predetermined size. The collar 508 inserted into the sleeve 470 and the insertion portion 470C are strongly sealed from each other by an elastic force of the O ring 516. Thus, it is possible to prevent leakage of the gas of the airtight container 412 between the insertion portion 470C of the sleeve 470 and the collar 508.

Since the gasket 510 is disposed between the flat surface 504 of the thick portion 413A of the airtight container 412 and the mounting portion 470B, the flat surface 504 of the thick portion 413A and the mounting portion 470B can be sealed from each other. Accordingly, it is possible to prevent leakage of the refrigerant gas of intermediate pressure of the airtight container 412 from the hole 502 among the gasket 510, the flat surface 504 of the thick portion 413A of the airtight container 412 and the mounting portion 470B of the sleeve 470.

The refrigerant introduction portion 496 is constituted as in the case of the refrigerant discharge portion 492. That is, a thick portion 413B similar to the thick portion 413A is disposed in the curved surface of the airtight container 412, and a hole 522 similar to the hole 502 is disposed in the thick portion 413B. Additionally, a flat surface 524 similar to the flat surface 504 is formed in the outer surface of the airtight container around the hole 522.

To suck the refrigerant from the outside of the airtight container 412 into the suction port 562, a sleeve 470 similar to the above that connects a hollow refrigerant pipe (not shown)

made of a material such as copper, aluminum or brass is mounted to the hole 522. Incidentally, a screw hole (not shown) is disposed in a position corresponding to the screw hole of the sleeve 470 in the thick portion 413B of the airtight container 412. This screw hole is formed with a depth which does not penetrate the thick portion 413B to prevent leakage of the refrigerant gas from the inside of the airtight container 412 to the outside.

The refrigerant pipe is inserted from the connection portion 470A side of the sleeve 470 into the insertion portion 470C until it comes into contact with the stopper, and the outer peripheral surface of the refrigerant pipe and the connection portion 470A are fixed to each other by welding. In a state in which the refrigerant pipe is welded and fixed to the connection portion 470A of the sleeve 470, one side of a tube suction 506 similar to the above is fitted to the suction passage 460 communicated from the hole 522 formed in the thick portion 413B of the airtight container 412 with the suction port 562 of the lower support member 456, and the collar 508 is fitted into the other side of the tube suction 506.

A groove (not shown) similar to the above is formed around an inner peripheral surface (mounting portion 470B side) of the insertion portion 470C of the sleeve 470. An elastic O ring 516 (equivalent to sealing material of the invention) made of heat resistant synthetic rubber is inserted into the groove to prevent gas leakage between the insertion portion 470C and the collar 508. Additionally, between a flat surface 524 of the thick portion 413B disposed in the refrigerant introduction portion 496 of the airtight container 412 and the mounting portion 470B, a gasket 510 made of a flexible and soft metal plate is inserted to prevent gas leakage.

Then, the screw 474 (one side is not shown) is inserted from the screw hole disposed in the mounting portion 470B, and fastened into the screw hole disposed in the thick portion 413B of the airtight container 412. Accordingly, the sleeve 470 is fixed to the refrigerant introduction portion 496 of the airtight container 412. At this time, the collar 508 projects from the flat surface 504 of the airtight container 412 by a predetermined size, and is inserted into the insertion portion 470C of the sleeve 470 by a predetermined size. The collar 508 inserted into the sleeve 470 and the insertion portion 470C are strongly sealed from each other by an elastic force of the O ring 516. Thus, it is possible to prevent leakage of the gas of the airtight container 412 between the insertion portion 470C of the sleeve 470 and the collar 508.

Since the gasket 510 is disposed between the flat surface 524 of the thick portion 413B of the airtight container 412 and the mounting portion 470B, the flat surface 524 of the thick portion 413B and the mounting portion 470B can be sealed from each other. Accordingly, it is possible to prevent leakage of the refrigerant gas of intermediate pressure of the airtight container 412 from the hole 502 among the gasket 510, the flat surface 524 of the thick portion 413B of the airtight container 412 and the mounting portion 470B of the sleeve 470.

As the refrigerant, the carbon dioxide ($CO_2$) which is a natural refrigerant friendly to the global environment is used in consideration of combustibility, toxicity and the like. As the oil which is lubricant oil, existing oil such as mineral oil, alkylbenzene oil, ether oil, ester oil or polyalkyl glycol (PAG) is used. The carbon dioxide is used for the refrigerant according to the embodiment. However, the invention is not limited to such a refrigerant. Other existing refrigerants such as a carbohydrate may be used.

Next, an operation of the rotary compressor 410 of the invention constituted in the foregoing manner will be described. When power is supplied to the stator coil 428 of the electric element 414 of the rotary compressor 410 through the wiring (not shown) and the terminal, the electric element 414 is started to rotate the rotor 424. By this rotation, the upper and lower rollers 446, 448 fitted to the upper and lower eccentric portions 442, 444 integrally disposed with the rotary shaft 416 are eccentrically rotated in the upper and lower cylinders 438, 440.

Thus, the low-pressure refrigerant gas passed from the refrigerant pipe through the suction passage 460 formed in the lower support member 456, and sucked from the suction port (not shown) into the low-pressure chamber side of the lower cylinder 440 is compressed by the operations of the roller 448 and the vane (not shown) to become a refrigerant gas of intermediate pressure, and discharged from the high-pressure chamber side of the lower cylinder 440 through the intermediate discharge pipe (not shown) into the airtight container 412. As a result, intermediate pressure is set in the airtight container 412. At this time, the refrigerant gas flows into the holes 502, 522 to set intermediate pressure therein. However, since the gaskets 510, 510 are inserted between both thick portions 413A, 413B of the sleeves 470, 470, the refrigerant gas discharged into the airtight container 412 never leaks to the outside thereof.

Then, the refrigerant gas of intermediate pressure in the airtight container 412 flows into the suction passage 458 formed in the upper cover 466, and sucked from the suction port 561 into the low-pressure chamber side of the upper cylinder 438 of the second rotary compression element 434. The refrigerant gas of intermediate pressure sucked into the low-pressure chamber side of the upper cylinder 438 is subjected to compression of a second stage by the operations of the roller 466 and the vane (not shown) to become a refrigerant gas of a high temperature and high pressure. The refrigerant gas of high pressure is passed from the high-pressure chamber side through the discharge port (not shown), and the discharge muffling chamber 462 formed in the upper support member 454, and discharged from the refrigerant discharge portion 492 to the outside.

Thus, the rotary compressor 410 comprises the electric element 414 and the first and second compression elements 432, 434 driven by the electric element 414 in the airtight container 412, and compresses the refrigerant sucked from the refrigerant pipe of the refrigerant introduction side by the first and second compression elements 432, 434 and discharges the refrigerant from the refrigerant pipe of the refrigerant discharge side. The sleeve 470 is disposed which is mounted corresponding to the holes 502, 522 formed in the curved surface of the airtight container 412, and to which the refrigerant pipes are connected. The flat surfaces 504, 524 are formed in the outer surface of the airtight container 412 around the holes 502, 522, and the sleeve 470 is fixed through the gasket 510 to the flat surfaces 504, 524 of the airtight container 412 by the screw 474. The collar 508 communicated with the first and second compression elements 432, 434 is brought into contact with the inside of the sleeve 470 through the O ring 516. Thus, it is possible to easily fix the sleeve 470 to the airtight container 412 even when the airtight container 412 is made of an aluminum material.

Accordingly, the airtight container 412 and the sleeve 470 can be sealed well when the sleeve 470 is fixed to the airtight container 412 by the screw 474. Moreover, since the leakage of the refrigerant gas discharged into the airtight container 412 to the outside can be surely prevented, it is possible to greatly improve the performance of the sealed type rotary compressor 410.

Especially, since the sleeve 470 is fixed through the gasket 510 to the flat surfaces 504, 524 around the holes formed in the outer surface of the airtight container 412 by the screw

474, the gasket 510 portion can play a role of a relief valve. Accordingly, it is possible to release high pressure from the gasket 510 portion to the outside of the airtight container 412 when the pressure of the refrigerant gas compressed by the first and second compression elements 432, 434 of the rotary compressor 410 excessively increases to set abnormally high pressure in the airtight container 412. Moreover, since it is possible to prevent the danger of destruction of the airtight container 412 caused by the abnormally high pressure therein, durability of the rotary compressor 410 can be greatly improved, and reliability thereof can be secured.

The embodiment has been described by way of case in which the sealed type compressor is the rotary compressor 410 of the internal intermediate pressure type multistage compression system. However, the sealed type compressor is not limited to the rotary compressor 410 of the internal intermediate pressure type multistage compression system. It may be a compressor of a multistage compression system in which intermediate pressure is set in the airtight container 412. The invention is similarly effective even when the sealed type compressor is not the compressor 410 of the multistage compression system but a compressor of a single compression system.

What is claimed is:

1. A method of manufacturing a compressor which comprises an electric element, a compression element connected to the electric element, and an airtight container to receive the electric element and the compression element therein, and which drives the compression element by the electric element to compress and discharge an introduced refrigerant, the method comprising:

bringing the compression element into contact with an inside of the airtight container;

forming a through-hole which penetrates the airtight container and reaches a predetermined depth of the compression element from an outside of the airtight container; and dropping droplets into the through-hole from a wire of a welder to weld the airtight container and the compression element together.

2. The method according to claim 1, wherein the airtight container and at least a portion of the compression element brought into contact with the airtight container are made of aluminum.

* * * * *